US011910119B2

(12) United States Patent
Liu

(10) Patent No.: US 11,910,119 B2
(45) Date of Patent: *Feb. 20, 2024

(54) DIGITAL PIXEL WITH EXTENDED DYNAMIC RANGE

(71) Applicant: Facebook Technologies, LLC, Menlo Park, CA (US)

(72) Inventor: Xinqiao Liu, Medina, WA (US)

(73) Assignee: Meta Platforms Technologies, LLC, Menlo Park, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/899,908

(22) Filed: Jun. 12, 2020

(65) Prior Publication Data

US 2021/0029286 A1   Jan. 28, 2021

Related U.S. Application Data

(63) Continuation of application No. 15/876,061, filed on Jan. 19, 2018, now Pat. No. 10,686,996.

(Continued)

(51) Int. Cl.
*H04N 5/235* (2006.01)
*H04N 5/353* (2011.01)
(Continued)

(52) U.S. Cl.
CPC ............ *H04N 23/73* (2023.01); *G01J 1/44* (2013.01); *G01S 3/00* (2013.01); *H04N 23/60* (2023.01);
(Continued)

(58) Field of Classification Search
CPC ..... H04N 5/3745–37455; H04N 5/378; H04N 5/3355; H04N 5/374–37457;
(Continued)

(56) References Cited

U.S. PATENT DOCUMENTS

| 4,596,977 A | 6/1986 | Bauman et al. |
|---|---|---|
| 5,053,771 A | 10/1991 | McDermott |

(Continued)

FOREIGN PATENT DOCUMENTS

| CN | 1490878 A | 4/2004 |
|---|---|---|
| CN | 1728397 A | 2/2006 |

(Continued)

OTHER PUBLICATIONS

U.S. Appl. No. 16/436,137, "Non-Final Office Action", dated Dec. 4, 2020, 12 pages.

(Continued)

*Primary Examiner* — Xi Wang
(74) *Attorney, Agent, or Firm* — Kilpatrick Townsend & Stockton LLP

(57) ABSTRACT

Examples of an apparatus are disclosed. In some example, an apparatus includes a photodiode configured to generate a charge in response to incident light; a measurement capacitor to store at least a part of the charge to generate a voltage; and an analog-to-digital converter (ADC) circuit configured to: in a first measurement period, compare the voltage at the measurement capacitor against a static threshold voltage to generate a first output; in a second measurement period, compare the voltage against a varying threshold voltage to generate a second output, wherein the varying threshold voltage varies with time according to a pre-determined pattern; and generate a final output representing an intensity of the incident light based on either the first output or the second output.

20 Claims, 17 Drawing Sheets

Related U.S. Application Data

(60) Provisional application No. 62/579,079, filed on Oct. 30, 2017, provisional application No. 62/525,045, filed on Jun. 26, 2017.

(51) Int. Cl.
| | |
|---|---|
| *H04N 5/378* | (2011.01) |
| *H04N 5/3745* | (2011.01) |
| *H04N 5/232* | (2006.01) |
| *H04N 23/73* | (2023.01) |
| *G01S 3/00* | (2006.01) |
| *G01J 1/44* | (2006.01) |
| *H04N 23/60* | (2023.01) |
| *H04N 25/59* | (2023.01) |
| *H04N 25/75* | (2023.01) |
| *H04N 25/531* | (2023.01) |
| *H04N 25/771* | (2023.01) |
| *H04N 25/772* | (2023.01) |
| *F21V 8/00* | (2006.01) |

(52) U.S. Cl.
CPC .......... *H04N 25/531* (2023.01); *H04N 25/59* (2023.01); *H04N 25/75* (2023.01); *H04N 25/771* (2023.01); *H04N 25/772* (2023.01); *G01J 2001/4406* (2013.01); *G01J 2001/446* (2013.01); *G02B 6/0016* (2013.01); *G02B 6/0038* (2013.01)

(58) Field of Classification Search
CPC .......... H03M 1/00–645; H01L 27/146–14893; H03K 21/00–406; H03K 23/00–86
USPC ............... 341/155–272; 348/308; 250/208.1; 257/225–234, 257, 258, 291–294, 257/431–448
See application file for complete search history.

(56) References Cited

U.S. PATENT DOCUMENTS

| | | |
|---|---|---|
| 5,650,643 A | 7/1997 | Konuma |
| 5,844,512 A | 12/1998 | Gorin et al. |
| 5,963,369 A | 10/1999 | Steinthal et al. |
| 6,181,822 B1 | 1/2001 | Miller et al. |
| 6,384,905 B1 | 5/2002 | Barrows |
| 6,522,395 B1 | 2/2003 | Bamji et al. |
| 6,529,241 B1 | 3/2003 | Clark |
| 6,864,817 B1 | 3/2005 | Salvi et al. |
| 6,963,369 B1 | 11/2005 | Olding |
| 7,326,903 B2 | 2/2008 | Ackland |
| 7,362,365 B1 | 4/2008 | Reyneri et al. |
| 7,659,772 B2 | 2/2010 | Nomura et al. |
| 7,659,925 B2 | 2/2010 | Krymski |
| 7,719,589 B2 | 5/2010 | Turchetta et al. |
| 7,880,779 B2 | 2/2011 | Storm |
| 7,956,914 B2 | 6/2011 | Xu |
| 8,134,623 B2 | 3/2012 | Purcell et al. |
| 8,144,227 B2 | 3/2012 | Kobayashi |
| 8,369,458 B2 | 2/2013 | Wong et al. |
| 8,426,793 B1 | 4/2013 | Barrows |
| 8,754,798 B2 | 6/2014 | Lin |
| 8,773,562 B1 | 7/2014 | Fan |
| 8,779,346 B2 | 7/2014 | Fowler et al. |
| 8,946,610 B2 | 2/2015 | Iwabuchi et al. |
| 9,001,251 B2 | 4/2015 | Smith et al. |
| 9,094,629 B2 | 7/2015 | Ishibashi |
| 9,185,273 B2 | 11/2015 | Beck et al. |
| 9,274,151 B2 | 3/2016 | Lee et al. |
| 9,282,264 B2 | 3/2016 | Park et al. |
| 9,332,200 B1 | 5/2016 | Hseih et al. |
| 9,343,497 B2 | 5/2016 | Cho |
| 9,363,454 B2 | 6/2016 | Ito et al. |
| 9,478,579 B2 | 10/2016 | Dai et al. |
| 9,497,396 B2 | 11/2016 | Choi |
| 9,531,990 B1 | 12/2016 | Wilkins et al. |
| 9,800,260 B1 | 10/2017 | Banerjee |
| 9,819,885 B2 | 11/2017 | Furukawa et al. |
| 9,832,370 B2 | 11/2017 | Cho et al. |
| 9,909,922 B2 | 3/2018 | Schweickert et al. |
| 9,948,316 B1 | 4/2018 | Yun et al. |
| 9,955,091 B1 | 4/2018 | Dai et al. |
| 9,967,496 B2 | 5/2018 | Ayers et al. |
| 10,003,759 B2 | 6/2018 | Fan |
| 10,015,416 B2 | 7/2018 | Borthakur et al. |
| 10,090,342 B1 | 10/2018 | Gambino et al. |
| 10,096,631 B2 | 10/2018 | Ishizu |
| 10,154,221 B2 | 12/2018 | Ogino et al. |
| 10,157,951 B2 | 12/2018 | Kim et al. |
| 10,321,081 B2 | 6/2019 | Watanabe et al. |
| 10,345,447 B1 | 7/2019 | Hicks |
| 10,419,701 B2 | 9/2019 | Liu |
| 10,574,925 B2 | 2/2020 | Otaka |
| 10,594,974 B2 | 3/2020 | Ivarsson et al. |
| 10,598,546 B2 | 3/2020 | Liu |
| 10,608,101 B2 | 3/2020 | Liu |
| 10,686,996 B2 | 6/2020 | Liu |
| 10,726,627 B2 | 7/2020 | Liu |
| 10,750,097 B2 | 8/2020 | Liu |
| 10,764,526 B1 | 9/2020 | Liu et al. |
| 10,804,926 B2 | 10/2020 | Gao et al. |
| 10,812,742 B2 | 10/2020 | Chen et al. |
| 10,825,854 B2 | 11/2020 | Liu |
| 10,834,344 B2 | 11/2020 | Chen et al. |
| 10,897,586 B2 | 1/2021 | Liu et al. |
| 10,903,260 B2 | 1/2021 | Chen et al. |
| 10,917,589 B2 | 2/2021 | Liu |
| 10,951,849 B2 | 3/2021 | Liu |
| 10,969,273 B2 | 4/2021 | Berkovich et al. |
| 11,004,881 B2 | 5/2021 | Liu et al. |
| 11,057,581 B2 | 7/2021 | Liu |
| 11,089,210 B2 | 8/2021 | Berkovich et al. |
| 2002/0067303 A1 | 6/2002 | Lee et al. |
| 2002/0113886 A1 | 8/2002 | Hynecek |
| 2002/0118289 A1 | 8/2002 | Choi |
| 2003/0001080 A1 | 1/2003 | Kummaraguntla et al. |
| 2003/0020100 A1 | 1/2003 | Guidash |
| 2003/0049925 A1 | 3/2003 | Layman et al. |
| 2004/0095495 A1 | 5/2004 | Inokuma et al. |
| 2004/0118994 A1 | 6/2004 | Mizuno |
| 2004/0251483 A1 | 12/2004 | Ko et al. |
| 2005/0046715 A1 | 3/2005 | Lim et al. |
| 2005/0057389 A1 | 3/2005 | Krymski |
| 2005/0104983 A1 | 5/2005 | Raynor |
| 2005/0206414 A1 | 9/2005 | Cottin et al. |
| 2005/0237380 A1 | 10/2005 | Kakii et al. |
| 2005/0280727 A1 | 12/2005 | Sato et al. |
| 2006/0023109 A1 | 2/2006 | Mabuchi et al. |
| 2006/0146159 A1 | 7/2006 | Farrier |
| 2006/0157759 A1 | 7/2006 | Okita et al. |
| 2006/0158541 A1 | 7/2006 | Ichikawa |
| 2007/0013983 A1 | 1/2007 | Kitamura et al. |
| 2007/0076109 A1 | 4/2007 | Krymski |
| 2007/0076481 A1 | 4/2007 | Tennant |
| 2007/0092244 A1 | 4/2007 | Pertsel et al. |
| 2007/0102740 A1 | 5/2007 | Ellis-Monaghan et al. |
| 2007/0131991 A1 | 6/2007 | Sugawa |
| 2007/0208526 A1 | 9/2007 | Staudt et al. |
| 2007/0222881 A1 | 9/2007 | Mentzer |
| 2008/0001065 A1 | 1/2008 | Ackland |
| 2008/0007731 A1 | 1/2008 | Botchway et al. |
| 2008/0042888 A1 | 2/2008 | Danesh |
| 2008/0068478 A1 | 3/2008 | Watanabe |
| 2008/0088014 A1 | 4/2008 | Adkisson et al. |
| 2008/0191791 A1 | 8/2008 | Nomura et al. |
| 2008/0226170 A1 | 9/2008 | Sonoda |
| 2008/0226183 A1 | 9/2008 | Lei et al. |
| 2008/0266434 A1 | 10/2008 | Sugawa et al. |
| 2009/0002528 A1 | 1/2009 | Manabe et al. |
| 2009/0033588 A1 | 2/2009 | Kajita et al. |
| 2009/0040364 A1 | 2/2009 | Rubner |
| 2009/0091645 A1 | 4/2009 | Trimeche et al. |
| 2009/0128640 A1 | 5/2009 | Yumiki |

(56) References Cited

U.S. PATENT DOCUMENTS

| | | |
|---|---|---|
| 2009/0140305 A1 | 6/2009 | Sugawa |
| 2009/0219266 A1 | 9/2009 | Lim et al. |
| 2009/0224139 A1 | 9/2009 | Buettgen et al. |
| 2009/0237536 A1 | 9/2009 | Purcell et al. |
| 2009/0244346 A1 | 10/2009 | Funaki |
| 2009/0245637 A1 | 10/2009 | Barman et al. |
| 2009/0261235 A1 | 10/2009 | Lahav et al. |
| 2009/0321615 A1 | 12/2009 | Sugiyama et al. |
| 2010/0013969 A1 | 1/2010 | Ui |
| 2010/0140732 A1 | 6/2010 | Eminoglu et al. |
| 2010/0194956 A1 | 8/2010 | Yuan et al. |
| 2010/0232227 A1 | 9/2010 | Lee |
| 2010/0276572 A1 | 11/2010 | Iwabuchi et al. |
| 2011/0049589 A1 | 3/2011 | Chuang et al. |
| 2011/0122304 A1 | 5/2011 | Sedelnikov |
| 2011/0149116 A1 | 6/2011 | Kim |
| 2011/0155892 A1 | 6/2011 | Neter et al. |
| 2011/0254986 A1 | 10/2011 | Nishimura et al. |
| 2012/0016817 A1 | 1/2012 | Smith et al. |
| 2012/0039548 A1 | 2/2012 | Wang et al. |
| 2012/0068051 A1* | 3/2012 | Ahn ................. H01L 27/14609 |
| | | 250/208.1 |
| 2012/0092677 A1 | 4/2012 | Suehira et al. |
| 2012/0105475 A1 | 5/2012 | Tseng |
| 2012/0105668 A1 | 5/2012 | Velarde et al. |
| 2012/0113119 A1 | 5/2012 | Massie |
| 2012/0127284 A1 | 5/2012 | Bar-Zeev et al. |
| 2012/0133807 A1* | 5/2012 | Wu ..................... H01L 27/14634 |
| | | 348/308 |
| 2012/0138775 A1 | 6/2012 | Cheon et al. |
| 2012/0153123 A1 | 6/2012 | Mao et al. |
| 2012/0188420 A1 | 7/2012 | Black et al. |
| 2012/0200499 A1 | 8/2012 | Osterhout et al. |
| 2012/0205520 A1 | 8/2012 | Hsieh et al. |
| 2012/0212465 A1 | 8/2012 | White et al. |
| 2012/0241591 A1 | 9/2012 | Wan et al. |
| 2012/0262616 A1 | 10/2012 | Sa et al. |
| 2012/0267511 A1 | 10/2012 | Kozlowski |
| 2012/0273654 A1 | 11/2012 | Hynecek et al. |
| 2012/0305751 A1 | 12/2012 | Kusuda |
| 2013/0020466 A1 | 1/2013 | Ayers et al. |
| 2013/0056809 A1 | 3/2013 | Mao et al. |
| 2013/0057742 A1 | 3/2013 | Nakamura et al. |
| 2013/0068929 A1 | 3/2013 | Solhusvik et al. |
| 2013/0069787 A1 | 3/2013 | Petrou |
| 2013/0082313 A1 | 4/2013 | Manabe |
| 2013/0113969 A1 | 5/2013 | Manabe et al. |
| 2013/0126710 A1 | 5/2013 | Kondo |
| 2013/0141619 A1 | 6/2013 | Lim et al. |
| 2013/0187027 A1 | 7/2013 | Qiao et al. |
| 2013/0207219 A1 | 8/2013 | Ahn |
| 2013/0214127 A1 | 8/2013 | Ohya et al. |
| 2013/0214371 A1 | 8/2013 | Asatsuma et al. |
| 2013/0218728 A1 | 8/2013 | Hashop et al. |
| 2013/0221194 A1 | 8/2013 | Manabe |
| 2013/0229543 A1 | 9/2013 | Hashimoto et al. |
| 2013/0229560 A1 | 9/2013 | Kondo |
| 2013/0234029 A1 | 9/2013 | Bikumandla |
| 2013/0293752 A1 | 11/2013 | Peng et al. |
| 2013/0299674 A1 | 11/2013 | Fowler et al. |
| 2014/0021574 A1 | 1/2014 | Egawa |
| 2014/0042299 A1 | 2/2014 | Wan et al. |
| 2014/0042582 A1 | 2/2014 | Kondo |
| 2014/0070974 A1 | 3/2014 | Park et al. |
| 2014/0078336 A1 | 3/2014 | Beck et al. |
| 2014/0085523 A1 | 3/2014 | Hynecek |
| 2014/0176770 A1 | 6/2014 | Kondo |
| 2014/0211052 A1 | 7/2014 | Choi |
| 2014/0232890 A1 | 8/2014 | Yoo et al. |
| 2014/0247382 A1 | 9/2014 | Moldovan et al. |
| 2014/0306276 A1 | 10/2014 | Yamaguchi |
| 2014/0368687 A1 | 12/2014 | Yu et al. |
| 2015/0070544 A1 | 3/2015 | Smith et al. |
| 2015/0077611 A1* | 3/2015 | Yamashita ........... H04N 5/3559 |
| | | 348/308 |
| 2015/0083895 A1 | 3/2015 | Hashimoto et al. |
| 2015/0085134 A1 | 3/2015 | Novotny et al. |
| 2015/0090863 A1 | 4/2015 | Mansoorian et al. |
| 2015/0172574 A1 | 6/2015 | Honda et al. |
| 2015/0179696 A1 | 6/2015 | Kurokawa et al. |
| 2015/0189209 A1 | 7/2015 | Yang et al. |
| 2015/0201142 A1 | 7/2015 | Smith et al. |
| 2015/0208009 A1 | 7/2015 | Oh et al. |
| 2015/0229859 A1 | 8/2015 | Guidash et al. |
| 2015/0237274 A1 | 8/2015 | Yang et al. |
| 2015/0279884 A1 | 10/2015 | Kusumoto |
| 2015/0281613 A1 | 10/2015 | Vogelsang et al. |
| 2015/0287766 A1 | 10/2015 | Kim et al. |
| 2015/0309311 A1 | 10/2015 | Cho |
| 2015/0309316 A1 | 10/2015 | Osterhout et al. |
| 2015/0312461 A1 | 10/2015 | Kim et al. |
| 2015/0312502 A1 | 10/2015 | Borremans |
| 2015/0312557 A1 | 10/2015 | Kim |
| 2015/0350582 A1 | 12/2015 | Korobov et al. |
| 2015/0358569 A1 | 12/2015 | Egawa |
| 2015/0358571 A1 | 12/2015 | Dominguez Castro et al. |
| 2015/0358593 A1 | 12/2015 | Sato |
| 2015/0381907 A1 | 12/2015 | Boettiger et al. |
| 2015/0381911 A1 | 12/2015 | Shen et al. |
| 2016/0011422 A1 | 1/2016 | Thurber et al. |
| 2016/0018645 A1 | 1/2016 | Haddick et al. |
| 2016/0021302 A1 | 1/2016 | Cho et al. |
| 2016/0028974 A1 | 1/2016 | Guidash et al. |
| 2016/0028980 A1 | 1/2016 | Kameyama et al. |
| 2016/0037111 A1 | 2/2016 | Dai et al. |
| 2016/0078614 A1 | 3/2016 | Ryu et al. |
| 2016/0088253 A1 | 3/2016 | Tezuka |
| 2016/0100113 A1 | 4/2016 | Oh et al. |
| 2016/0100115 A1 | 4/2016 | Kusano |
| 2016/0111457 A1 | 4/2016 | Sekine |
| 2016/0112626 A1 | 4/2016 | Shimada |
| 2016/0118992 A1 | 4/2016 | Milkov |
| 2016/0165160 A1 | 6/2016 | Hseih et al. |
| 2016/0197117 A1 | 7/2016 | Nakata et al. |
| 2016/0204150 A1 | 7/2016 | Oh et al. |
| 2016/0210785 A1 | 7/2016 | Balachandreswaran et al. |
| 2016/0240570 A1 | 8/2016 | Barna et al. |
| 2016/0249004 A1 | 8/2016 | Saeki et al. |
| 2016/0255293 A1* | 9/2016 | Gesset ................. H03M 1/56 |
| | | 348/308 |
| 2016/0277010 A1* | 9/2016 | Park ....................... H03K 5/24 |
| 2016/0307945 A1 | 10/2016 | Madurawe |
| 2016/0307949 A1 | 10/2016 | Madurawe |
| 2016/0337605 A1 | 11/2016 | Ito |
| 2016/0353045 A1 | 12/2016 | Kawahito et al. |
| 2016/0360127 A1 | 12/2016 | Dierickx et al. |
| 2017/0013215 A1 | 1/2017 | McCarten |
| 2017/0039906 A1 | 2/2017 | Jepsen |
| 2017/0041571 A1 | 2/2017 | Tyrrell et al. |
| 2017/0053962 A1 | 2/2017 | Oh et al. |
| 2017/0059399 A1 | 3/2017 | Suh et al. |
| 2017/0062501 A1 | 3/2017 | Velichko et al. |
| 2017/0069363 A1 | 3/2017 | Baker |
| 2017/0070691 A1 | 3/2017 | Nishikido |
| 2017/0099422 A1 | 4/2017 | Goma et al. |
| 2017/0099446 A1 | 4/2017 | Cremers et al. |
| 2017/0104021 A1 | 4/2017 | Park et al. |
| 2017/0104946 A1 | 4/2017 | Hong |
| 2017/0111600 A1 | 4/2017 | Wang et al. |
| 2017/0141147 A1 | 5/2017 | Raynor |
| 2017/0154909 A1 | 6/2017 | Ishizu |
| 2017/0170223 A1 | 6/2017 | Hynecek et al. |
| 2017/0195602 A1 | 7/2017 | Wabuchi et al. |
| 2017/0201693 A1 | 7/2017 | Sugizaki et al. |
| 2017/0207268 A1 | 7/2017 | Kurokawa |
| 2017/0228345 A1 | 8/2017 | Gupta et al. |
| 2017/0251151 A1 | 8/2017 | Hicks |
| 2017/0270664 A1 | 9/2017 | Hoogi et al. |
| 2017/0272667 A1 | 9/2017 | Hynecek |
| 2017/0272768 A1 | 9/2017 | Tall et al. |
| 2017/0280031 A1 | 9/2017 | Price et al. |
| 2017/0293799 A1 | 10/2017 | Skogo et al. |
| 2017/0310910 A1 | 10/2017 | Smith et al. |
| 2017/0318250 A1 | 11/2017 | Sakakibara et al. |

(56) References Cited

U.S. PATENT DOCUMENTS

| | | | |
|---|---|---|---|
| 2017/0324917 A1 | 11/2017 | Mlinar et al. |
| 2017/0338262 A1 | 11/2017 | Hirata |
| 2017/0339327 A1 | 11/2017 | Koshkin et al. |
| 2017/0346579 A1 | 11/2017 | Barghi |
| 2017/0350755 A1 | 12/2017 | Geurts |
| 2017/0359497 A1 | 12/2017 | Mandelli et al. |
| 2017/0366766 A1 | 12/2017 | Geurts et al. |
| 2018/0019269 A1 | 1/2018 | Klipstein |
| 2018/0077368 A1 | 3/2018 | Suzuki |
| 2018/0115725 A1 | 4/2018 | Zhang et al. |
| 2018/0136471 A1 | 5/2018 | Miller et al. |
| 2018/0143701 A1 | 5/2018 | Suh et al. |
| 2018/0152650 A1 | 5/2018 | Sakakibara et al. |
| 2018/0167575 A1 | 6/2018 | Watanabe et al. |
| 2018/0175083 A1 | 6/2018 | Takahashi |
| 2018/0176545 A1 | 6/2018 | Aflaki Beni |
| 2018/0204867 A1 | 7/2018 | Kim et al. |
| 2018/0220093 A1 | 8/2018 | Murao et al. |
| 2018/0224658 A1 | 8/2018 | Teller |
| 2018/0227516 A1 | 8/2018 | Mo et al. |
| 2018/0241953 A1 | 8/2018 | Johnson |
| 2018/0270436 A1 | 9/2018 | Ivarsson et al. |
| 2018/0276841 A1 | 9/2018 | Krishnaswamy et al. |
| 2018/0376046 A1 | 12/2018 | Liu |
| 2018/0376090 A1 | 12/2018 | Liu |
| 2019/0035154 A1 | 1/2019 | Liu |
| 2019/0046044 A1 | 2/2019 | Tzvieli et al. |
| 2019/0052788 A1 | 2/2019 | Liu |
| 2019/0052821 A1 | 2/2019 | Berner et al. |
| 2019/0056264 A1 | 2/2019 | Liu |
| 2019/0057995 A1 | 2/2019 | Liu |
| 2019/0058058 A1 | 2/2019 | Liu |
| 2019/0098232 A1 | 3/2019 | Mori et al. |
| 2019/0104263 A1 | 4/2019 | Ochiai et al. |
| 2019/0104265 A1 | 4/2019 | Totsuka et al. |
| 2019/0110039 A1 | 4/2019 | Linde et al. |
| 2019/0123088 A1 | 4/2019 | Kwon |
| 2019/0141270 A1 | 5/2019 | Otaka et al. |
| 2019/0149751 A1 | 5/2019 | Wise |
| 2019/0157330 A1 | 5/2019 | Sato et al. |
| 2019/0172227 A1 | 6/2019 | Kasahara |
| 2019/0172868 A1 | 6/2019 | Chen et al. |
| 2019/0191116 A1 | 6/2019 | Madurawe |
| 2019/0246036 A1 | 8/2019 | Wu et al. |
| 2019/0253650 A1 | 8/2019 | Kim |
| 2019/0327439 A1 | 10/2019 | Chen et al. |
| 2019/0331914 A1 | 10/2019 | Lee et al. |
| 2019/0335151 A1 | 10/2019 | Rivard et al. |
| 2019/0348460 A1 | 11/2019 | Chen et al. |
| 2019/0355782 A1 | 11/2019 | Do et al. |
| 2019/0363118 A1 | 11/2019 | Berkovich et al. |
| 2019/0371845 A1 | 12/2019 | Chen et al. |
| 2019/0376845 A1 | 12/2019 | Liu et al. |
| 2019/0379388 A1 | 12/2019 | Gao et al. |
| 2019/0379827 A1 | 12/2019 | Berkovich et al. |
| 2019/0379846 A1 | 12/2019 | Chen et al. |
| 2020/0007800 A1 | 1/2020 | Berkovich et al. |
| 2020/0053299 A1 | 2/2020 | Zhang et al. |
| 2020/0059589 A1 | 2/2020 | Liu et al. |
| 2020/0068189 A1 | 2/2020 | Chen et al. |
| 2020/0186731 A1 | 6/2020 | Chen et al. |
| 2020/0195875 A1 | 6/2020 | Berkovich et al. |
| 2020/0217714 A1 | 7/2020 | Liu |
| 2020/0228745 A1 | 7/2020 | Otaka |
| 2020/0374475 A1 | 11/2020 | Fukuoka et al. |
| 2021/0026796 A1 | 1/2021 | Graif et al. |
| 2021/0099659 A1 | 4/2021 | Miyauchi et al. |
| 2021/0185264 A1 | 6/2021 | Wong et al. |
| 2021/0227159 A1 | 7/2021 | Sambonsugi |
| 2021/0368124 A1 | 11/2021 | Berkovich et al. |

FOREIGN PATENT DOCUMENTS

| | | |
|---|---|---|
| CN | 1812506 A | 8/2006 |
| CN | 101753866 A | 6/2010 |
| CN | 103002228 A | 3/2013 |
| CN | 103207716 A | 7/2013 |
| CN | 104125418 A | 10/2014 |
| CN | 104204904 A | 12/2014 |
| CN | 104469195 A | 3/2015 |
| CN | 104704812 A | 6/2015 |
| CN | 104733485 A | 6/2015 |
| CN | 104754255 A | 7/2015 |
| CN | 204633945 U | 9/2015 |
| CN | 105144699 A | 12/2015 |
| CN | 105529342 A | 4/2016 |
| CN | 105706439 A | 6/2016 |
| CN | 205666884 U | 10/2016 |
| CN | 106255978 A | 12/2016 |
| CN | 106791504 A | 5/2017 |
| CN | 107852473 A | 3/2018 |
| CN | 109298528 A | 2/2019 |
| DE | 202016105510 | 10/2016 |
| EP | 0675345 A2 | 10/1995 |
| EP | 1681856 | 7/2006 |
| EP | 1732134 | 12/2006 |
| EP | 1746820 A1 | 1/2007 |
| EP | 1788802 A1 | 5/2007 |
| EP | 2037505 A1 | 3/2009 |
| EP | 2063630 A1 | 5/2009 |
| EP | 2538664 | 12/2012 |
| EP | 2804074 A2 | 11/2014 |
| EP | 2833619 | 2/2015 |
| EP | 3032822 A1 | 6/2016 |
| EP | 3229457 A1 | 10/2017 |
| EP | 3258683 | 12/2017 |
| EP | 3425352 | 1/2019 |
| EP | 3439039 A1 | 2/2019 |
| EP | 3744085 A2 | 12/2020 |
| JP | H08195906 A | 7/1996 |
| JP | 2001008101 A | 1/2001 |
| JP | 2002199292 A | 7/2002 |
| JP | 2003319262 A | 11/2003 |
| JP | 2005328493 A | 11/2005 |
| JP | 2006197382 A | 7/2006 |
| JP | 2006203736 A | 8/2006 |
| JP | 2007074447 A | 3/2007 |
| JP | 2011216966 A | 10/2011 |
| JP | 2012054495 A | 3/2012 |
| JP | 2012054876 A | 3/2012 |
| JP | 2012095349 A | 5/2012 |
| JP | 2013009087 A | 1/2013 |
| JP | 2013055581 A | 3/2013 |
| JP | 2013172203 A | 9/2013 |
| JP | 2013225774 A | 10/2013 |
| JP | 2014107596 A | 6/2014 |
| JP | 2014165733 A | 9/2014 |
| JP | 2014236183 A | 12/2014 |
| JP | 2015065524 A | 4/2015 |
| JP | 2015126043 A | 7/2015 |
| JP | 2015530855 A | 10/2015 |
| JP | 2015211259 A | 11/2015 |
| JP | 2016092661 A | 5/2016 |
| JP | 2016513942 A | 5/2016 |
| JP | 2017509251 A | 3/2017 |
| KR | 100574959 | 4/2006 |
| KR | 20080019652 A | 3/2008 |
| KR | 20090023549 A | 3/2009 |
| KR | 20110050351 A | 5/2011 |
| KR | 20110134941 A | 12/2011 |
| KR | 20120058337 A | 6/2012 |
| KR | 20120117953 A | 10/2012 |
| KR | 20150095841 | 8/2015 |
| KR | 20160008267 A | 1/2016 |
| KR | 20160008287 | 1/2016 |
| TW | 201448184 A | 12/2014 |
| TW | 201719874 A | 6/2017 |
| TW | 201728161 A | 8/2017 |
| TW | 624694 B | 5/2018 |
| WO | WO-2006124592 A2 | 11/2006 |
| WO | 2006129762 A1 | 12/2006 |
| WO | 2010117462 A1 | 10/2010 |
| WO | 2013099723 A1 | 7/2013 |
| WO | WO-2014055391 A2 | 4/2014 |

(56) References Cited

FOREIGN PATENT DOCUMENTS

| WO | 2014144391 | A1 | 9/2014 |
|---|---|---|---|
| WO | 2015135836 | A1 | 9/2015 |
| WO | 2015182390 | A1 | 12/2015 |
| WO | 2016014860 | A1 | 1/2016 |
| WO | WO-2016095057 | A1 | 6/2016 |
| WO | 2016194653 | A1 | 12/2016 |
| WO | WO-2017003477 | A1 | 1/2017 |
| WO | WO-2017013806 | A1 | 1/2017 |
| WO | WO-2017047010 | A1 | 3/2017 |
| WO | 2017058488 | | 4/2017 |
| WO | 2017069706 | A1 | 4/2017 |
| WO | 2017169882 | | 10/2017 |
| WO | WO-2017169446 | A1 | 10/2017 |
| WO | WO-2019018084 | A1 | 1/2019 |
| WO | WO-2019111528 | A1 | 6/2019 |
| WO | WO-2019145578 | A1 | 8/2019 |
| WO | 2019168929 | A1 | 9/2019 |

OTHER PUBLICATIONS

U.S. Appl. No. 16/566,583, "Corrected Notice of Allowability", dated Dec. 11, 2020, 2 pages.
U.S. Appl. No. 15/719,345, "Final Office Action", dated Apr. 29, 2020, 14 pages.
U.S. Appl. No. 15/719,345, "Non- Final Office Action", dated Nov. 25, 2019, 14 pages.
U.S. Appl. No. 15/801,216, "Non-Final Office Action", dated Jun. 27, 2019, 13 pages.
U.S. Appl. No. 15/847,517, "Non-Final Office Action", dated Nov. 23, 2018, 21 pages.
U.S. Appl. No. 15/847,517, "Notice of Allowance", dated May 1, 2019, 11 pages.
U.S. Appl. No. 15/876,061, "Corrected Notice of Allowability", dated Apr. 28, 2020, 3 pages.
U.S. Appl. No. 15/876,061, "Non-Final Office Action", dated Sep. 18, 2019, 23 pages.
U.S. Appl. No. 15/876,061, "Notice of Allowability", dated May 6, 2020, 2 pages.
U.S. Appl. No. 15/876,061, "Notice of Allowance", dated Feb. 4, 2020, 13 pages.
U.S. Appl. No. 15/927,896, "Non-Final Office Action", dated May 1, 2019, 10 pages.
U.S. Appl. No. 16/566,583, "Final Office Action", dated Apr. 15, 2020, 24 pages.
U.S. Appl. No. 16/566,583, "Non-Final Office Action", dated Oct. 1, 2019, 10 pages.
Cho, et al., "A Low Power Dual CDS for a column Parallel CMOS Image Sensor", Journal of Semiconductor Technology and Science, vol. 12, No. 4, Dec. 30, 2012, pp. 388-396.
EP18179838.0, "Extended European Search Report", dated May 24, 2019, 17 pages.
EP18179838.0, "Partial European Search Report", dated Dec. 5, 2018, 14 pages.
EP18179846.3, "Extended European Search Report", dated Dec. 7, 2018, 10 pages.
EP18179851.3, "Extended European Search Report", dated Dec. 7, 2018, 8 pages.
EP18188962.7, "Extended European Search Report", dated Oct. 23, 2018, 8 pages.
EP18188962.7, "Office Action", dated Aug. 28, 2019, 6 pages.
Kavusi, et al., "Quantitative Study of High-Dynamic-Range Image Sensor Architectures", Proceedings of SPIE, The International Society for Optical Engineering, vol. 5301, Jun. 7, 2004, pp. 264-275.
PCT/US2018/039350, "International Preliminary Report on Patentability", dated Jan. 9, 2020, 10 pages.
PCT/US2018/039350, "International Search Report and Written Opinion", dated Nov. 15, 2018, 13 pages.
PCT/US2018/039352, "International Search Report and Written Opinion", dated Oct. 26, 2018, 10 pages.
PCT/US2018/039431, "International Search Report and Written Opinion", dated Nov. 7, 2018, 14 pages.
PCT/US2018/045673, "International Search Report and Written Opinion", dated Dec. 4, 2018, 13 pages.
U.S. Appl. No. 15/719,345, "Notice of Allowance", dated Sep. 3, 2020, 12 pages.
U.S. Appl. No. 16/454,787, "Notice of Allowance", dated Sep. 9, 2020, 9 pages.
U.S. Appl. No. 16/707,988, "Non-Final Office Action", dated Sep. 22, 2020, 15 pages.
U.S. Appl. No. 15/719,345 , Notice of Allowance, dated Aug. 12, 2020, 11 pages.
U.S. Appl. No. 15/861,588 , Non-Final Office Action, dated Jul. 10, 2019, 11 pages.
U.S. Appl. No. 15/861,588 , Notice of Allowance, dated Nov. 26, 2019, 9 pages.
U.S. Appl. No. 15/983,379 , Notice of Allowance, dated Oct. 18, 2019, 9 pages.
U.S. Appl. No. 16/177,971 , Final Office Action, dated Feb. 27, 2020, 9 pages.
U.S. Appl. No. 16/177,971 , Non-Final Office Action, dated Sep. 25, 2019, 9 pages.
U.S. Appl. No. 16/177,971 , Notice of Allowance, dated Apr. 24, 2020, 6 pages.
U.S. Appl. No. 16/249,420 , Non-Final Office Action, dated Jul. 22, 2020, 9 pages.
U.S. Appl. No. 16/286,355 , Non-Final Office Action, dated Oct. 1, 2019, 6 pages.
U.S. Appl. No. 16/286,355 , Notice of Allowance, dated Feb. 12, 2020, 7 pages.
U.S. Appl. No. 16/286,355 , Notice of Allowance, dated Jun. 4, 2020, 7 pages.
U.S. Appl. No. 16/369,763 , Non-Final Office Action, dated Jul. 22, 2020, 15 pages.
U.S. Appl. No. 16/382,015 , Notice of Allowance, dated Jun. 11, 2020, 11 pages.
U.S. Appl. No. 16/431,693 , Non-Final Office Action, dated Jan. 30, 2020, 6 pages.
U.S. Appl. No. 16/431,693 , Notice of Allowance, dated Jun. 24, 2020, 7 pages.
U.S. Appl. No. 16/454,787 , Notice of Allowance, dated Apr. 22, 2020, 10 pages.
U.S. Appl. No. 16/454,787 , Notice of Allowance, dated Jul. 9, 2020, 9 pages.
U.S. Appl. No. 16/566,583 , Non-Final Office Action, dated Jul. 27, 2020, 11 pages.
Application No. EP18188968.4 , Extended European Search Report, dated Oct. 23, 2018, 8 pages.
Application No. EP18188968.4 , Office Action, dated Aug. 14, 2019, 5 pages.
Application No. EP18189100.3 , Extended European Search Report, dated Oct. 9, 2018, 8 pages.
Application No. PCT/US2018/045661 , International Search Report and Written Opinion, dated Nov. 30, 2018, 11 Pages.
Application No. PCT/US2018/046131 , International Search Report and Written Opinion, dated Dec. 3, 2018, 10 pages.
Application No. PCT/US2019/019756 , International Search Report and Written Opinion, dated Jun. 13, 2019, 11 pages.
Application No. PCT/US2019/027729 , International Search Report and Written Opinion, dated Jun. 27, 2019, 10 pages.
Application No. PCT/US2019/035724 , International Search Report and Written Opinion, dated Sep. 10, 2019, 12 pages.
Application No. PCT/US2019/036484 , International Search Report and Written Opinion, dated Sep. 19, 2019, 10 pages.
Application No. PCT/US2019/036575 , International Search Report and Written Opinion, dated Sep. 30, 2019, 16 pages.
Application No. PCT/US2019/039410 , International Search Report and Written Opinion, dated Sep. 30, 2019, 11 pages.
Application No. PCT/US2019/039758 , International Search Report and Written Opinion, dated Oct. 11, 2019, 13 pages.
Application No. PCT/US2019/048241 , International Search Report and Written Opinion, dated Jan. 28, 2020, 16 pages.

(56) References Cited

OTHER PUBLICATIONS

Application No. PCT/US2019/065430, International Search Report and Written Opinion, dated Mar. 6, 2020, 15 pages.
Snoeij, "A Low Power Column-Parallel 12-Bit ADC for CMOS Imagers", Institute of Electrical and Electronics Engineers Workshop on Charge-Coupled Devices And Advanced Image Sensors, Jun. 2005, pp. 169-172.
Xu et al., "A New Digital-Pixel Architecture for CMOS Image Sensor with Pixel-Level ADC and Pulse Width Modulation using a 0.18 Mu M CMOS Technology", Institute of Electrical and Electronics Engineers Conference on Electron Devices and Solid-State Circuits, Dec. 16-18, 2003, pp. 265-268.
U.S. Appl. No. 16/707,988, "Notice of Allowance", dated May 5, 2021, 14 pages.
U.S. Appl. No. 16/820,594, "Non-Final Office Action", dated Jul. 2, 2021, 8 pages.
U.S. Appl. No. 17/072,840, "Non-Final Office Action", dated Jun. 8, 2021, 7 pages.
U.S. Appl. No. 17/150,925, "Notice of Allowance", dated Jul. 8, 2021, 10 pages.
European Communication Pursuant to Article 94(3) EPC dated Jul. 7, 2021.
U.S. Appl. No. 16/707,988, Corrected Notice of Allowability dated Jul. 26, 2021, 2 pages.
U.S. Appl. No. 16/896,130, Notice of Allowance dated Jul. 13, 2021, 8 pages.
U.S. Appl. No. 16/436,049, Notice of Allowance dated Oct. 21, 2020, 8 pages.
U.S. Appl. No. 16/435,451, Final Office Action dated Jul. 12, 2021, 13 pages.
U.S. Appl. No. 16/435,451, "Non-Final Office Action", dated Feb. 1, 2021, 14 pages.
U.S. Appl. No. 16/566,583, "Corrected Notice of Allowability", dated Feb. 3, 2021, 2 pages.
U.S. Appl. No. 16/896,130, "Non-Final Office Action", dated Mar. 15, 2021, 16 pages.
Taiwan Application No. 107124385, Office Action dated Sep. 30, 2021, 17 pages (8 pages of Original Document and 9 pages of English Translation).
Advisory Action dated Apr. 7, 2020 for U.S. Appl. No. 15/801,216, filed Nov. 1, 2019, 3 Pages.
Advisory Action dated Oct. 23, 2019 for U.S. Appl. No. 15/668,241, filed Aug. 3, 2017, 5 Pages.
Extended European Search Report for European Application No. 18188684.7, dated Jan. 16, 2019, 10 Pages.
Final Office Action dated Jul. 7, 2020 for U.S. Appl. No. 16/210,748, filed Dec. 5, 2018, 11 Pages.
Final Office Action dated Jun. 17, 2019 for U.S. Appl. No. 15/668,241, filed Aug. 3, 2017, 19 Pages.
Final Office Action dated Dec. 26, 2019 for U.S. Appl. No. 15/801,216, filed Nov. 1, 2017, 5 Pages.
International Search Report and Written Opinion for International Application No. PCT/US2018/045666, dated Dec. 3, 2018, 13 Pages.
International Search Report and Written Opinion for International Application No. PCT/US2018/064181, dated Mar. 29, 2019, 10 Pages.
International Search Report and Written Opinion for International Application No. PCT/US2019/014044, dated May 8, 2019, 9 Pages.
International Search Report and Written Opinion for International Application No. PCT/US2019/025170, dated Jul. 9, 2019, 11 Pages.
International Search Report and Written Opinion for International Application No. PCT/US2019/027727, dated Jun. 27, 2019, 10 Pages.
International Search Report and Written Opinion for International Application No. PCT/US2019/031521, dated Jul. 11, 2019, 8 Pages.
International Search Report and Written Opinion for International Application No. PCT/US2019/036492, dated Sep. 25, 2019, 8 Pages.
International Search Report and Written Opinion for International Application No. PCT/US2019/036536, dated Sep. 26, 2019, 13 Pages.
International Search Report and Written Opinion for International Application No. PCT/US2019/047156, dated Oct. 23, 2019, 9 Pages.
International Search Report and Written Opinion for International Application No. PCT/US2019/049756, dated Dec. 16, 2019, 8 pages.
International Search Report and Written Opinion for International Application No. PCT/US2019/059754, dated Mar. 24, 2020, 11 Pages.
Non-Final Office Action dated May 1, 2020 for U.S. Appl. No. 16/384,720, filed Apr. 15, 2019, 6 Pages.
Non-Final Office Action dated Mar. 4, 2020 for U.S. Appl. No. 16/436,049, filed Jun. 10, 2019, 9 Pages.
Non-Final Office Action dated Dec. 21, 2018 for U.S. Appl. No. 15/668,241, filed Aug. 3, 2017, 16 Pages.
Non-Final Office Action dated Aug. 29, 2019 for U.S. Appl. No. 15/983,391, filed May 18, 2018, 12 Pages.
Non-Final Office Action dated Jun. 30, 2020 for U.S. Appl. No. 16/436,049, filed Jun. 10, 2019, 11 Pages.
Non-Final Office Action dated Jan. 31, 2020 for U.S. Appl. No. 16/210,748, filed Dec. 5, 2018, 11 Pages.
Notice of Allowance dated Nov. 3, 2020 for U.S. Appl. No. 16/566,583, filed Sep. 10, 2019, 11 Pages.
Notice of Allowance dated Mar. 5, 2020 for U.S. Appl. No. 15/668,241, filed Aug. 3, 2017, 8 Pages.
Notice of Allowance dated Apr. 8, 2020 for U.S. Appl. No. 15/983,391, filed May 18, 2018, 8 Pages.
Notice of Allowance dated Nov. 22, 2021 for U.S. Appl. No. 16/820,594, filed Mar. 16, 2020, 18 pages.
Notice of Allowance dated Jun. 23, 2020 for U.S. Appl. No. 15/801,216, filed Nov. 1, 2017, 5 Pages.
Notice of Allowance dated Jul. 27, 2020 for U.S. Appl. No. 16/435,449, filed Jun. 7, 2019, 8 Pages.
Notice of Allowance dated Jun. 29, 2020 for U.S. Appl. No. 15/668,241, filed Aug. 3, 2017, 8 Pages.
Notice of Reason for Rejection dated Nov. 16, 2021 for Japanese Application No. 2019-571699, filed Jun. 25, 2018, 13 pages.
Office Action dated Nov. 26, 2019 for European Application No. 18188684.7, filed Aug. 13, 2018, 9 Pages.
Supplemental Notice of Allowability dated Apr. 29, 2020 for U.S. Appl. No. 15/668,241, filed Aug. 3, 2017, 5 Pages.
Tanner S., et al., "Low-Power Digital Image Sensor for Still Picture Image Acquisition," Visual Communications and Image Processing, San Jose, Jan. 22, 2001, vol. 4306, pp. 358-365, XP008014232.
Advisory Action dated Oct. 8, 2020 for U.S. Appl. No. 16/210,748, filed Dec. 5, 2018, 4 Pages.
Advisory Action dated Oct. 1, 2021 for U.S. Appl. No. 17/083,920, filed Oct. 29, 2020, 4 pages.
Amir M.F., et al., "3-D Stacked Image Sensor With Deep Neural Network Computation," IEEE Sensors Journal, IEEE Service Center, New York, Ny, US, May 15, 2018, vol. 18 (10), pp. 4187-4199, XP011681876.
Chuxi L., et al., "A Memristor-Based Processing-in-Memory Architechture for Deep Convolutional Neural Networks Approximate Computation," Journal of Computer Research and Development, Jun. 30, 2017, vol. 54 (6), pp. 1367-1380.
Communication Pursuant Article 94(3) dated Dec. 23, 2021 for European Application No. 19744961.4, filed Jun. 28, 2019, 8 pages.
Communication Pursuant Article 94(3) dated Jan. 5, 2022 for European Application No. 19740456.9, filed Jun. 27, 2019, 12 pages.
Corrected Notice of Allowability dated Apr. 9, 2021 for U.S. Appl. No. 16/255,528, filed Jan. 23, 2019, 5 Pages.
Corrected Notice of Allowance dated Mar. 7, 2022 for U.S. Appl. No. 17/150,925, filed Jan. 15, 2021, 2 Pages.
Extended European Search Report for European Application No. 19743908.6, dated Sep. 30, 2020, 9 Pages.
Final Office Action dated Oct. 18, 2021 for U.S. Appl. No. 16/716,050, filed Dec. 16, 2019, 18 Pages.

(56) References Cited

OTHER PUBLICATIONS

Final Office Action dated Oct. 21, 2021 for U.S. Appl. No. 16/421,441, filed May 23, 2019, 23 Pages.
Final Office Action dated Jan. 27, 2021 for U.S. Appl. No. 16/255,528, filed Jan. 23, 2019, 31 Pages.
Final Office Action dated Jul. 28, 2021 for U.S. Appl. No. 17/083,920, filed Oct. 29, 2020, 19 Pages.
International Preliminary Report on Patentability for International Application No. PCT/US2020/044807, dated Feb. 17, 2022, 10 pages.
International Search Report and Written Opinion for International Application No. PCT/US2019/014904, dated Aug. 5, 2019, 7 Pages.
International Search Report and Written Opinion for International Application No. PCT/US2019/019765, dated Jun. 14, 2019, 9 Pages.
International Search Report and Written Opinion for International Application No. PCT/US2019/034007, dated Oct. 28, 2019, 18 Pages.
International Search Report and Written Opinion for International Application No. PCT/US2019/066805, dated Mar. 6, 2020, 9 Pages.
International Search Report and Written Opinion for International Application No. PCT/US2019/066831, dated Feb. 27, 2020, 11 Pages.
International Search Report and Written Opinion for International Application No. PCT/US2020/044807, dated Sep. 30, 2020, 12 Pages.
International Search Report and Written Opinion for International Application No. PCT/US2020/058097, dated Feb. 12, 2021, 09 Pages.
International Search Report and Written Opinion for International Application No. PCT/US2020/059636, dated Feb. 11, 2021, 18 Pages.
International Search Report and Written Opinion for International Application No. PCT/US2021/031201, dated Aug. 2, 2021, 13 Pages.
International Search Report and Written Opinion for International Application No. PCT/US2021/033321, dated Sep. 6, 2021, 11 pages.
International Search Report and Written Opinion for International Application No. PCT/US2021/041775, dated Nov. 29, 2021, 14 pages.
International Search Report and Written Opinion for International Application No. PCT/US2021/054327, dated Feb. 14, 2022, 8 pages.
International Search Report and Written Opinion for International Application No. PCT/US2021/057966, dated Feb. 22, 2022, 15 pages.
International Search Report and Written Opinion for International Application No. PCT/US2021/065174 dated Mar. 28, 2022, 10 pages.
Millet L., et al., "A 5500-Frames/s 85-GOPS/W 3-D Stacked BSI Vision Chip Based on Parallel In-Focal-Plane Acquisition and Processing," IEEE Journal of Solid-State Circuits, USA, Apr. 1, 2019, vol. 54 (4), pp. 1096-1105, XP011716786.
Non-Final Office Action dated Jan. 1, 2021 for U.S. Appl. No. 16/715,792, filed Dec. 16, 2019, 15 Pages.
Non-Final Office Action dated Mar. 2, 2022 for U.S. Appl. No. 17/127,670, filed Dec. 18, 2020, 18 pages.
Non-Final Office Action dated Sep. 2, 2021 for U.S. Appl. No. 16/910,844, filed Jun. 24, 2020, 7 Pages.
Non-Final Office Action dated May 7, 2021 for U.S. Appl. No. 16/421,441, filed May 23, 2019, 17 Pages.
Non-Final Office Action dated Jul. 10, 2020 for U.S. Appl. No. 16/255,528, filed Jan. 23, 2019, 27 Pages.
Non-Final Office Action dated May 14, 2021 for U.S. Appl. No. 16/716,050, filed Dec. 16, 2019, 16 Pages.
Non-Final Office Action dated Apr. 21, 2021 for U.S. Appl. No. 16/453,538, filed Jun. 26, 2019, 16 Pages.
Non-Final Office Action dated Apr. 21, 2021 for U.S. Appl. No. 17/083,920, filed Oct. 29, 2020, 17 Pages.
Non-Final Office Action dated Oct. 21, 2021 for U.S. Appl. No. 17/083,920, filed Oct. 29, 2020, 19 Pages.
Non-Final Office Action dated Jul. 25, 2019 for U.S. Application No. 15/909, 162, filed Mar. 1, 2018, 20 Pages.
Non-Final Office Action dated Apr. 27, 2021 for U.S. Appl. No. 16/829,249, filed Mar. 25, 2020, 9 Pages.
Notice of Allowance dated Apr. 1, 2021 for U.S. Appl. No. 16/255,528, filed Jan. 23, 2019, 7 Pages.
Notice of Allowance dated Mar. 2, 2022 for U.S. Appl. No. 16/453,538, filed Jun. 26, 2019, 8 pages.
Notice of Allowance dated Nov. 2, 2021 for U.S. Appl. No. 16/453,538, filed Jun. 26, 2019, 8 Pages.
Notice of Allowance dated Mar. 7, 2022 for U.S. Appl. No. 16/421,441, filed May 23, 2019, 18 pages.
Notice of Allowance dated Dec. 8, 2021 for U.S. Appl. No. 16/829,249, filed Mar. 25, 2020, 6 pages.
Notice of Allowance dated Mar. 11, 2022 for U.S. Appl. No. 16/716,050, filed Dec. 16, 2019, 13 pages.
Notice of Allowance mailed Feb. 14, 2022 for U.S. Appl. No. 16/715,792, filed Dec. 16, 2019, 9 pages.
Notice of Allowance mailed Oct. 14, 2020 for U.S. Appl. No. 16/384,720, filed Apr. 15, 2019, 8 Pages.
Notice of Allowance dated Oct. 15, 2020 for U.S. Appl. No. 16/544,136, filed Aug. 19, 2019, 11 Pages.
Notice of Allowance dated Apr. 16, 2021 for U.S. Appl. No. 16/715,792, filed Dec. 16, 2019, 10 Pages.
Notice of Allowance dated Feb. 16, 2022 for U.S. Appl. No. 17/150,925, filed Jan. 15, 2021, 9 pages.
Notice of Allowance dated Sep. 16, 2020 for U.S. Appl. No. 16/435,449, filed Jun. 7, 2019, 7 Pages.
Notice of Allowance dated Mar. 18, 2020 for U.S. Appl. No. 15/909,162, filed Mar. 1, 2018, 9 Pages.
Notice of Allowance dated Nov. 18, 2020 for U.S. Appl. No. 16/249,420, filed Jan. 16, 2019, 8 Pages.
Notice of Allowance dated Dec. 21, 2021 for U.S. Appl. No. 16/550,851, filed Aug. 26, 2019, 10 pages.
Notice of Allowance dated Dec. 22, 2021 for U.S. Appl. No. 16/910,844, filed Jun. 24, 2020, 7 pages.
Notice of Allowance dated Feb. 22, 2022 for U.S. Appl. No. 17/083,920, filed Oct. 29, 2020, 10 pages.
Notice of Allowance dated Jan. 22, 2021 for U.S. Appl. No. 16/369,763, filed Mar. 29, 2019, 8 Pages.
Notice of Allowance dated Nov. 24, 2021 for U.S. Appl. No. 16/910,844, filed Jun. 24, 2020, 8 pages.
Notice of Allowance dated Aug. 25, 2021 for U.S. Appl. No. 16/715,792, filed Dec. 16, 2019, 9 Pages.
Notice of Allowance dated Aug. 26, 2020 for U.S. Appl. No. 16/384,720, filed Apr. 15, 2019, 8 Pages.
Notice of Allowance dated Aug. 30, 2021 for U.S. Appl. No. 16/829,249, filed Mar. 25, 2020, 8 pages.
Notification of the First Office Action dated Oct. 28, 2021 for Chinese Application No. 2019800218483, filed Jan. 24, 2019, 17 pages.
Office Action dated Jul. 3, 2020 for Chinese Application No. 201810821296, filed Jul. 24, 2018, 17 Pages.
Office Action dated Jul. 7, 2021 for European Application No. 19723902.3, filed Apr. 1, 2019, 3 Pages.
Office Action dated Mar. 9, 2021 for Chinese Application No. 201810821296, filed Jul. 24, 2018, 10 Pages.
Office Action dated Dec. 14, 2021 for Japanese Application No. 2019571598, filed Jun. 26, 2018, 12 pages.
Office Action dated Mar. 15, 2022 for Japanese Patent Application No. 2020505830, filed on Aug. 9, 2018, 12 pages.
Office Action dated Jun. 28, 2020 for Chinese Application No. 201810821296, filed Jul. 24, 2018, 2 Pages.
Partial International Search Report and Provisional Opinion for International Application No. PCT/US2021/041775, dated Oct. 8, 2021, 12 pages.
Restriction Requirement dated Feb. 2, 2021 for U.S. Appl. No. 16/716,050, filed Dec. 16, 2019, 7 Pages.

(56) References Cited

OTHER PUBLICATIONS

Sebastian A., et al., "Memory Devices and Applications for In-memory Computing," Nature Nanotechnology, Nature Publication Group, Inc, London, Mar. 30, 2020, vol. 15 (7), pp. 529-544, XP037194929.
Shi C., et al., "A 1000fps Vision Chip Based on a Dynamically Reconfigurable Hybrid Architecture Comprising a PE Array and Self-Organizing Map Neural Network," International Solid-State Circuits Conference, Session 7, Image Sensors, Feb. 10, 2014, pp. 128-130, XP055826878.
Snoeij M.F., et al., "A low Power col. Parallel 12-bit ADC for CMOS Imagers," XP007908033, Jun. 1, 2005, pp. 169-172.
Corrected Notice of Allowance dated Mar. 29, 2022 for U.S. Appl. No. 17/150,925, filed Jan. 15, 2021, 2 Pages.
Non-Final Office Action dated Mar. 28, 2022 for U.S. Appl. No. 17/072,840, filed Oct. 16, 2020, 8 Pages.
Notice of Allowance dated Apr. 27, 2022 for U.S. Appl. No. 16/896,130, filed Jun. 8, 2020, 08 pages.
Notice of Allowance dated Apr. 28, 2022 for U.S. Appl. No. 16/435,451, filed Jun. 7, 2019, 09 pages.
Notice of Allowance dated Jun. 8, 2022 for U.S. Appl. No. 17/150,925, filed Jan. 15, 2021, 10 pages.
Office Action for European Application No. 18179851.3, dated May 19, 2022, 7 pages.
Office Action dated Mar. 17, 2022 for Taiwan Application No. 20180124384, 26 pages.
Office Action dated May 18, 2022 for Taiwan Application No. 108122878, 24 pages.
Office Action dated Mar. 29, 2022 for Japanese Patent Application No. 2020520431, filed on Jun. 25, 2018, 10 bages.
Office Action dated Jul. 5, 2022 for Korean Application No. 10-2020-7002533, filed Jun. 25, 2018, 13 pages.
Office Action dated Jul. 12, 2022 for Japanese Application No. 2019-571699, filed Jun. 25, 2018, 5 pages.
Office Action dated Jul. 19, 2022 for Japanese Application No. 2019571598, filed Jun. 26, 2018, 10 pages.
Office Action dated Aug. 30, 2022 for Japanese Patent Application No. 2020505830, filed on Aug. 9, 2018, 5 pages.
Corrected Notice of Allowability dated Jan. 9, 2023 for U.S. Appl. No. 17/150,925, filed Jan. 15, 2021, 8 pages.
Final Office Action dated Dec. 2, 2022 for U.S. Appl. No. 17/072,840, filed Oct. 16, 2020, 9 pages.
Notice of Allowance dated Dec. 6, 2022 for U.S. Appl. No. 16/896,130, filed Jun. 8, 2020, 8 pages.
Notice of Allowance dated Apr. 7, 2021 for U.S. Appl. No. 16/436,137, filed Jun. 10, 2019, 9 pages.
Notice of Allowance dated Dec. 9, 2022 for U.S. Appl. No. 16/435,451, filed Jun. 7, 2019, 8 pages.
Notice of Allowance dated Dec. 13, 2022 for U.S. Appl. No. 16/820,594, filed Mar. 16, 2020, 5 pages.
Notice of Allowance dated Nov. 21, 2022 for U.S. Appl. No. 17/242,152, filed Apr. 27, 2021, 10 pages.
Notice of Allowance dated Dec. 22, 2022 for U.S. Appl. No. 17/496,712, filed Oct. 7, 2021, 13 pages.
Office Action dated Nov. 2, 2022 for Taiwan Application No. 107128759, filed Aug. 17, 2018, 16 pages.
Office Action dated Dec. 1, 2022 for Korean Application No. 10-2020-7002306, filed Jun. 25, 2018, 13 pages.
Office Action dated Nov. 1, 2022 for Japanese Patent Application No. 2020-520431, filed on Jun. 25, 2018, 11 pages.
Office Action dated Nov. 15, 2022 for Taiwan Application No. 108120143, filed Jun. 11, 2019, 8 pages.
Office Action dated Sep. 26, 2022 for Korean Patent Application No. 10-2020-7002496, filed on Jun. 26, 2018, 17 pages.
Office Action dated Sep. 29, 2022 for Taiwan Application No. 108122878, filed Jun. 28, 2019, 9 pages.
International Preliminary Report on Patentability for International Application No. PCT/US2021/054327, dated Apr. 20, 2023, 7 pages.
Notice of Allowance dated Mar. 1, 2023 for U.S. Appl. No. 17/242,152, filed Apr. 27, 2021, 9 pages.
Notice of Allowance dated Apr. 13, 2023 for U.S. Appl. No. 17/072,840, filed Oct. 16, 2020, 6 pages.
Notice of Allowance dated Mar. 17, 2023 for U.S. Appl. No. 16/896,130, filed Jun. 8, 2020, 8 pages.
Notice of Allowance dated Mar. 27, 2023 for U.S. Appl. No. 16/820,594, filed Mar. 16, 2020, 5 pages.
Office Action dated Mar. 10, 2023 for Chinese Application No. 201880053600.0, filed Jun. 25, 2018, 10 pages.
Office Action dated Feb. 15, 2023 for Chinese Application No. 201980049477.X, filed Jun. 11, 2019, 19 pages.
Office Action dated Mar. 16, 2023 for Korean Patent Application No. 10-2020-7002496, filed on Jun. 26, 2018, 3 pages.
Office Action dated Jan. 5, 2023 for Chinese Application No. 201980043907.7, filed Jun. 28, 2019, 14 pages.
Office Action dated Feb. 7, 2023 for Japanese Application No. 2019-571699, filed Jun. 25, 2018, 5 pages.
Corrected Notice of Allowance dated Aug. 9, 2023 for U.S. Appl. No. 17/072,840, filed Oct. 16, 2020, 3 pages.
International Preliminary Report on Patentability for International Application No. PCT/US2021/057966, dated May 19, 2023, 12 pages.
International Preliminary Report on Patentability for International Application No. PCT/US2021/065174 dated Jul. 13, 2023, 9 pages.
Notice of Allowance dated Jul. 7, 2023 for U.S. Appl. No. 16/896,130, filed Jun. 8, 2020, 8 pages.
Notice of Allowance dated Jun. 16, 2023 for U.S. Appl. No. 17/242,152, filed Apr. 27, 2021, 9 pages.
Notice of Allowance dated Aug. 18, 2023 for U.S. Appl. No. 17/496,712, filed Oct. 7, 2021, 12 pages.
Notice of Allowance dated Jul. 19, 2023 for U.S. Appl. No. 16/820,594, filed Mar. 16, 2020, 5 pages.
Notice of Allowance dated Jun. 22, 2023 for U.S. Appl. No. 16/435,451, filed Jun. 7, 2019, 10 pages.
Notice of Allowance dated Apr. 24, 2023 for U.S. Appl. No. 17/496,712, filed Oct. 7, 2021, 12 pages.
Notice of Allowance dated Jul. 31, 2023 for U.S. Appl. No. 17/072,840, filed Oct. 16, 2020, 6 pages.
Office Action dated Jul. 4, 2023 for Korean Application No. 10-2020-7002533, filed Jun. 25, 2018, 3 pages.
Office Action dated Jun. 1, 2023 for Korean Application No. 10-2020-7002306, filed Jun. 25, 2018, 3 pages.
Office Action dated Jul. 4, 2023 for Japanese Application No. 2019571598, filed Jun. 26, 2018, 34 pages.
Office Action dated May 9, 2023 for Japanese Patent Application No. 2020-5204312, filed on Jun. 25, 2018, 6 pages.
Office Action dated May 9, 2023 for Japanese Patent Application No. 2020-563959, filed on Nov. 12, 2020, 5 pages.

\* cited by examiner

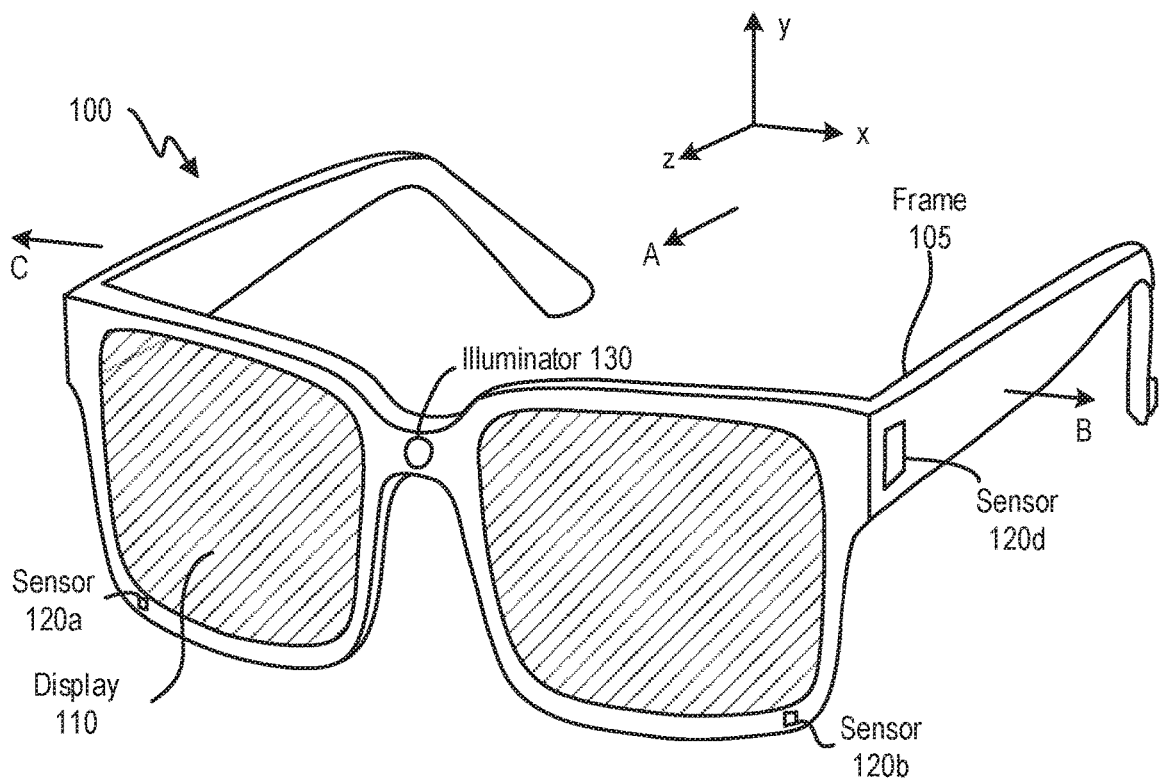
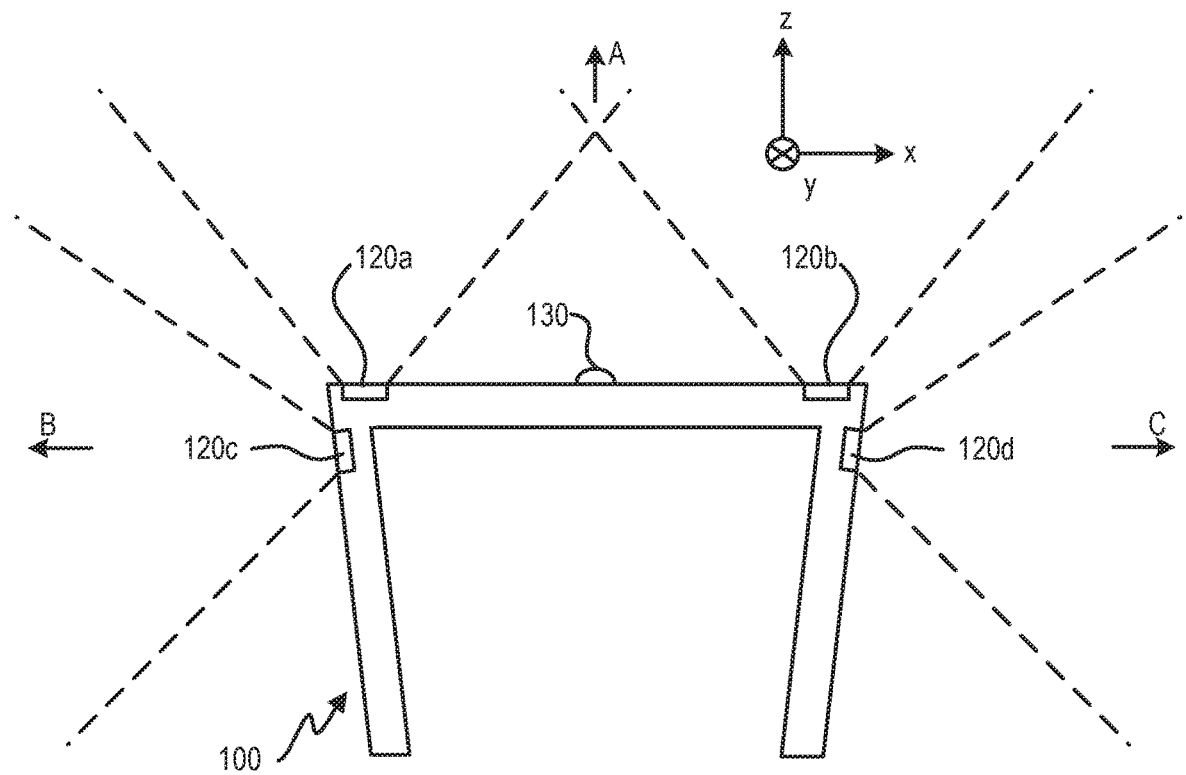
FIG. 1A

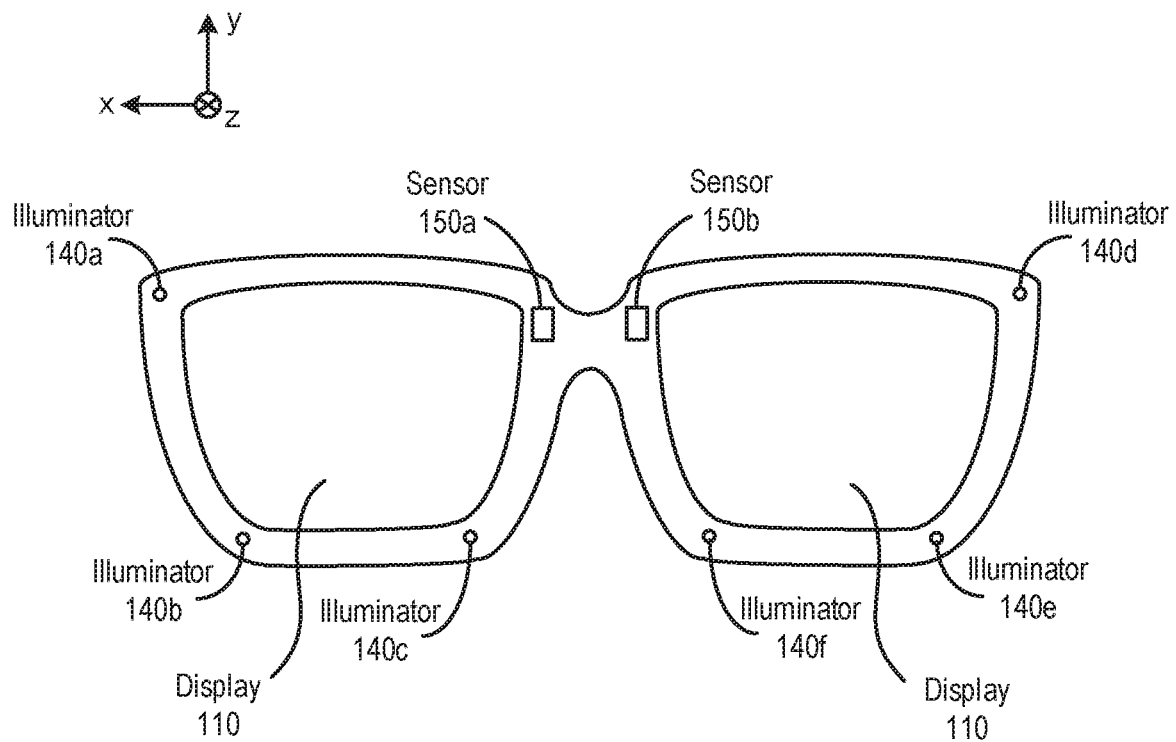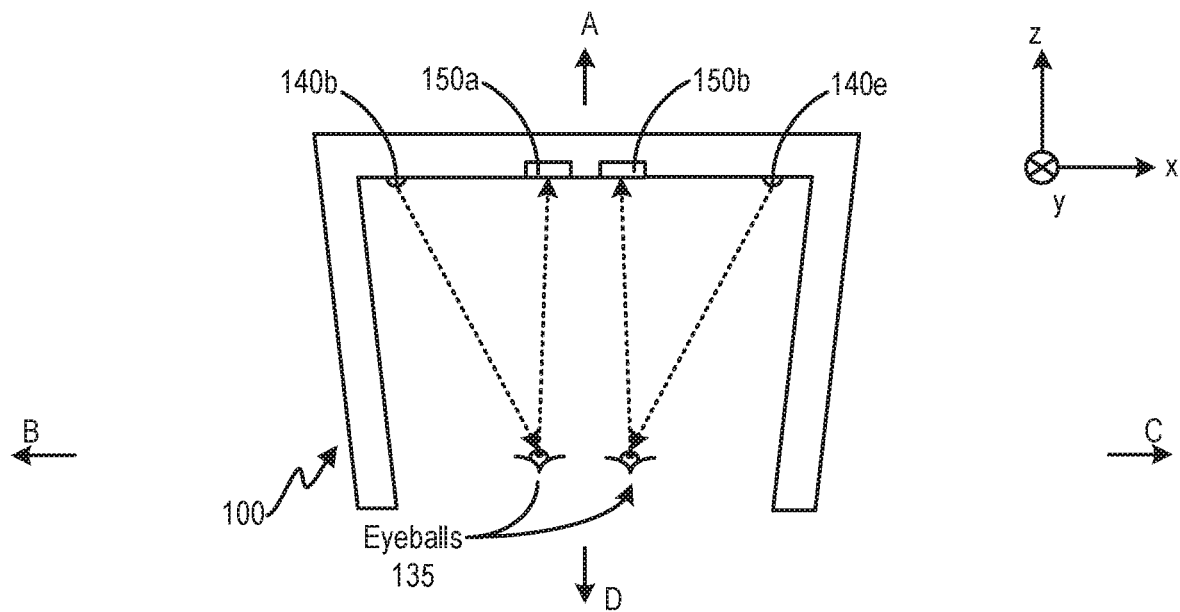
FIG. 1B

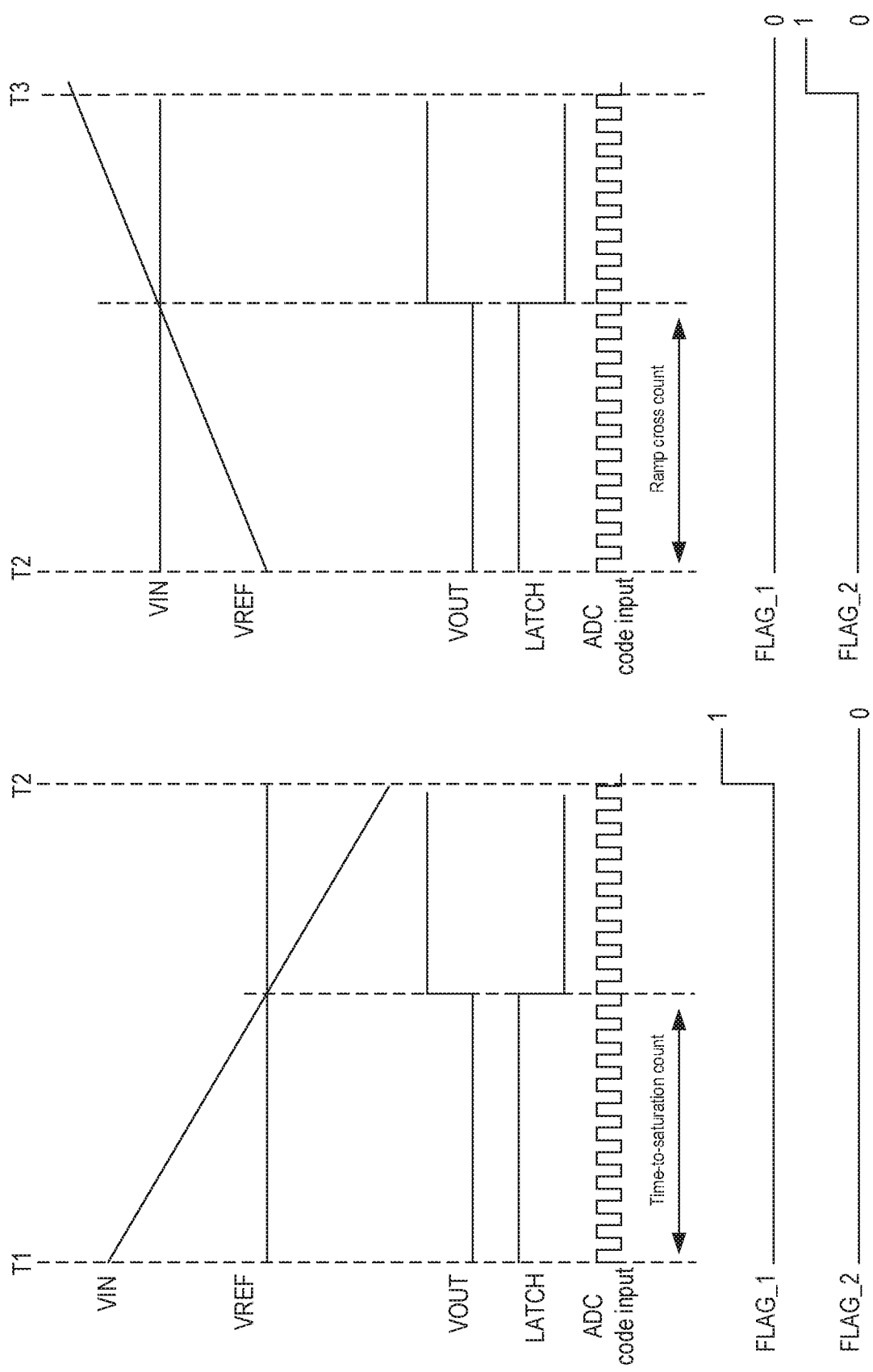

DIGITAL PIXEL WITH EXTENDED DYNAMIC RANGE

RELATED APPLICATION

This application is continuation of U.S. Non-Provisional application Ser. No. 15/876,061, filed on Jan. 19, 2018, and titled "DIGITAL PIXEL WITH EXTENDED DYNAMIC RANGE," which claims the benefit and priority to U.S. Provisional Patent Application No. 62/525,045, filed Jun. 26, 2017, entitled "HIGH SPEED, HIGH DYNAMIC RANGE, LOW POWER MACHINE VISION SENSOR DEVELOPMENT," and U.S. Provisional Patent Application No. 62/579,079, filed Oct. 30, 2017, entitled "DIGITAL PIXEL WITH EXTENDED DYNAMIC RANGE," which are assigned to the assignee hereof and are incorporated herein by reference in their entirety for all purposes.

BACKGROUND

The disclosure relates generally to image sensors, and more specifically to pixel cell structure including interfacing circuitries for determining light intensity for image generation.

A typical image sensor includes a photodiode to sense incident light by converting photons into charges (e.g., electrons or holes). The image sensor further includes a floating node configured as a capacitor to collect the charges generated by the photodiode during an exposure period. The collected charges can develop a voltage at the capacitor. The voltage can be buffered and fed to an analog-to-digital converter (ADC), which can convert the voltage into a digital value representing the intensity of the incident light.

SUMMARY

The present disclosure relates to image sensors. More specifically, and without limitation, this disclosure relates to using a stack structure for forming a pixel cell. This disclosure also relates to operating the circuitries of a pixel cells to measure the intensity of incident lights in two different measurement modes.

In one example, an apparatus is provided. The apparatus may include a photodiode, a first charge storage unit, and a second charge storage unit. Both of the first charge storage unit and the second charge storage unit are configured to store charges generated by the photodiode. The first charge storage unit has a first capacity, whereas the second charge storage unit has a second capacity greater than the first capacity. The apparatus may further include an analog-to-digital converter (ADC) circuit configured to, in a first mode of measurement, generate a first ramping voltage using a first counter, and compare a first voltage representing a first quantity of charges stored in the first charge storage unit against the first ramping voltage to generate a first decision output, the first decision output setting a first count at the first counter. The ADC circuit is also configured to, in a second mode of measurement, generate a second ramping voltage using a second counter; and compare a second voltage representing a second quantity of charges stored in the second charge storage unit against the second ramping voltage to generate a second decision output, the second decision output setting a second count at the second counter. The ADC circuit is also configured to generate a digital output representing an intensity of light incident on the photodiode based on either the first count or the second count.

In some aspects, the apparatus further comprises a transfer gate coupled between the first charge storage unit and the second charge storage unit. In the second mode of measurement, the ADC circuit is configured to control the transfer gate to prevent the first quantity of charges from moving through the transfer gate to the second charge storage unit; and compare, using a first comparator, the second voltage developed at the second charge storage unit against the second ramping voltage to generate the second count.

In some aspects, in the first mode of measurement, the ADC circuit is configured to control the transfer gate to enable the first quantity of charges to move through the transfer gate to the second charge storage unit. The ADC circuit is also configured to compare, using a second comparator, the first voltage developed at the second charge storage unit against the first ramping voltage to generate the first count.

In some aspects, the ADC circuit is configured to reset the second charge storage unit between the second mode of measurement and the first mode of measurement.

In some aspects, the ADC circuit comprises a third capacitor coupled between the second charge storage unit and at least one of the first comparator or the second comparator. The third capacitor is configured to store charges during the resetting of the second charge storage unit to compensate for at least one of: reset noise introduced to the second charge storage unit or an offset voltage of the at least one of the first comparator or the second comparator.

In some aspects, the second capacity of the second charge storage unit is configurable. The ADC circuit is configured to reduce the second capacity at the first mode of measurement and to increase the second capacity at the second mode of measurement.

In some aspects, the ADC circuit is configured to perform the first mode of measurement after the second mode of measurement. The ADC circuit is further configured to: determine, based on the first decision output and the second decision output, to store one of the first count or the second count in a memory; and provide the stored first count or second count in the memory as the digital output representing the intensity of the light.

In some aspects, at least one of the first counter or the second counter is configured to generate, respectively, at least one of the first ramping voltage or the second ramping voltage to have a non-uniform ramping slope with respect to time.

In some aspects, the ADC circuit is further configured to, in a third mode of measurement: compare the second voltage against a fixed threshold to generate a third decision output indicating whether the second voltage crosses the fixed threshold; and generate the digital output representing an intensity of light incident on the photodiode based a timing of the third decision output. In some aspects, the ADC circuit is further configured to, in the third mode of measurement: start a third counter after enabling the photodiode to transfer charges to the second charge storage unit, and set a third count at the third counter with the third decision output. The digital output representing the intensity of the light can be generated based on the third count.

In some aspects, the ADC circuit is configured to perform the third mode of measurement before the second mode of measurement and the first mode of measurement. The ADC circuit is further configured to: store the third count in a memory; determine, based on the third decision output, not to overwrite the third count with the first count or the second count in the memory; and provide the stored third count in the memory as the digital output representing the intensity of the light.

In some aspects, the first counter may comprise the second counter. The first comparator may also comprise the second comparator.

In another example, a method is provided. The method comprises exposing a photodiode to incident light to cause the photodiode to generate charges, wherein the photodiode is coupled with a first charge storage unit and a second charge storage unit, the first charge storage unit having a first capacity and the second charge storage unit having a second capacity greater than the first capacity. The method further comprises performing a first mode of measurement. The first mode of measurement comprises generating a first ramping voltage using a first counter, and comparing a first voltage representing a first quantity of charges stored in the first charge storage unit against the first ramping voltage, to generate a first decision output, the first decision output setting a first count at the first counter. The method further comprises performing a second mode of measurement. The second mode of measurement comprises generating a second ramping voltage using a second counter; and comparing a second voltage representing a second quantity of charges stored in the second charge storage unit against the second ramping voltage, to generate a second decision output, the second decision output setting a second count at the second counter. The method further comprises generating a digital output representing an intensity of the incident light based on either the first count or the second count.

In some aspects, the first charge storage unit is coupled to second charge storage unit via a transfer gate, and performing the second mode of measurement further comprises: controlling the transfer gate to prevent the first quantity of charges from moving through the transfer gate to the second charge storage unit; and comparing the second voltage developed at the second charge storage unit against the second ramping voltage to generate the second count.

In some aspects, performing the first mode of measurement further comprises: controlling the transfer gate to enable the first quantity of charges to move through the transfer gate to the second charge storage unit; and comparing the first voltage developed at the second charge storage unit against the first ramping voltage to generate the first count.

In some aspects, at least one of the first ramping voltage or the second ramping voltage is generated to have a non-uniform ramping slope with respect to time.

In some aspects, the method may further comprise performing a third mode of measurement. Performing the third mode of measurement may comprise: comparing the second voltage against a fixed threshold to generate a third decision output indicating whether the second voltage crosses the fixed threshold; and generating the digital output representing an intensity of light incident on the photodiode based a timing of the third decision output. The third mode of measurement may be performed before the first mode of measurement and the second mode of measurement are performed.

BRIEF DESCRIPTION OF THE DRAWINGS

Illustrative embodiments are described with reference to the following figures.

FIGS. 1A and 1B are diagrams of an embodiment of a near-eye display.

FIGS. 12A, 12B, 12C, and 12D illustrate example methods for determining light intensity.

Figure 2:
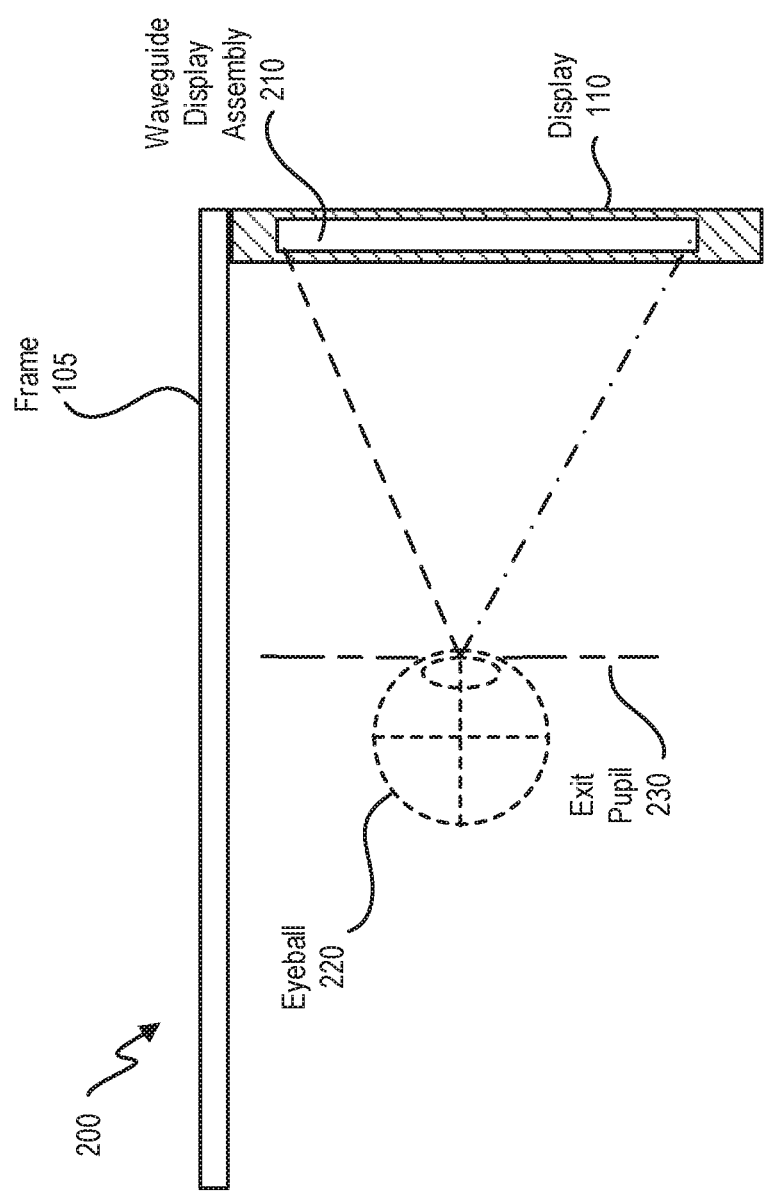
FIG. 2 is an embodiment of a cross section of the near-eye display.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

A typical image sensor includes a photodiode to sense incident light by converting photons into charges (e.g., electrons or holes). The image sensor further includes a floating node configured as a capacitor to collect the charges generated by the photodiode during an exposure period. The collected charges can develop a voltage at the capacitor. The voltage can be buffered and fed to an analog-to-digital converter (ADC), which can convert the voltage into a digital value representing the intensity of the incident light.

The digital value generated by the ADC, which reflects a number of charges stored at the floating node within a certain period, may correlate to the intensity of the incident light. However, the degree of correlation can be affected by different factors. First, the quantity of charges stored in the floating node can be directly related to the intensity of the incident light until the floating node reaches a saturation limit. Beyond the saturation limit, the floating node may be unable to accept additional charges generated by the photodiode, and the additional charges may be leaked and not stored. As a result, the quantity of the charges stored at the floating node may be lower than the quantity of charges actually generated by the photodiode. The saturation limit may determine an upper limit of the measureable light intensity of the image sensor.

Various factors can also set a lower limit of the measureable light intensity of the image sensor. For example, the charges collected at the floating node may include noise charges not related to the intensity of incident light. One source of noise charges can be dark current, which can be leakage currents generated at the p-n junction of the photodiode and at the p-n junctions of other semiconductor devices connected to the capacitor, due to crystallographic defects. The dark currents can flow into the capacitor and add charges which are not correlated to the intensity of the incident light. The dark current generated at the photodiode is typically less than the dark current generated at other semiconductor devices. Another source of noise charges can be due to capacitive coupling with other circuitries. For example, when the ADC circuitries perform read operations to determine the quantity of charges stored in the floating node, the ADC circuitries can introduce noise charges into the floating node through capacitive coupling.

Besides noise charges, the ADC can also introduce measurement errors in determining the quantity of charges. The measurement errors can degrade the degree of correlation between the digital output and the intensity of the incident light. One source of measurement error is quantization error. In a quantization process, a discrete set of quantity levels can be used to represent a continuous set of quantities of charges, with each quantity level representing a pre-determined quantity of charges. The ADC can compare an input quantity of charges against the quantity levels, determine the quantity level that is closest to the input quantity, and output the determined quantity level (e.g., in the form of digital codes representing the quantity level). Quantization error can occur when there is a mismatch between a quantity of charges represented by the quantity level and the input quantity of charges mapped to the quantity level. The quantization error can be reduced with smaller quantization step sizes (e.g., by reducing the difference in charge quantities between two adjacent quantity levels). Other sources of measurement error may also include, for example, device noises (e.g., of the ADC circuitries) and comparator offsets that add to uncertainties in the measurement of the quantity of charges. The noise charges and the ADC measurement errors can define a lower limit of the measureable light intensity of the image sensor. A ratio between the upper limit and the lower limit defines a dynamic range, which may set a range of operational light intensities for the image sensor.

An image can be generated based on intensity data provided by an array of image sensors, with each image sensor forming a pixel cell that corresponds to a pixel of the image. The array of pixel cells can be arranged into rows and columns, with each pixel cell generating a voltage representing the intensity for a pixel associated with a particular location in the image. A number of pixels included in the array can determine a resolution of the generated image. The voltage can be converted into digital intensity data by an ADC, and an image can be reconstructed based on the digital intensity data of each pixel. With current technologies, some of the pixel cells may have to take a turn in accessing the ADCs to generate digital intensity data. For example, a set of ADCs is provided to process, simultaneously, the voltages generated by each pixel cell within one row. But adjacent rows of pixel cells may have to take a turn in accessing the set of ADCs. In one example, to generate an image, the pixel array can be operated in a rolling shuttering fashion, in which each pixel row is exposed to incident lights to generate intensity data sequentially. For example, one pixel row of image sensors can be exposed to the incident lights in an exposure period. Each pixel cell within the row can generate a voltage based on the charges generated by the photodiode during the exposure period, and forward the voltage to the ADC. The ADCs can generate a set of digital data representing the intensities of the incident lights received by that pixel row. After the set of digital data is generated for one pixel row, the next pixel row can be exposed to the incident lights in a subsequent exposure period to generate another set of digital intensity data, until all of the pixel rows have been exposed to the incident light and have output intensity data. In yet another example, the exposure time of different rows of pixels can have some overlap, but each row of pixels still needs to take a turn in converting the voltages generated from the photodiode charges into digital data. An image can be generated based on the digital intensity data of each pixel row.

Image sensors can be found in many different applications. As an example, image sensors are included in digital imaging devices (e.g., digital cameras, smart phones, etc.) to provide digital imaging. As another example, image sensors can be configured as input devices to control or influence the operation of a device, such as controlling or influencing the display content of a near-eye display in wearable virtual-reality (VR) systems and/or augmented-reality (AR) and/or mixed reality (MR) systems. For example, the image sensors can be used to generate physical image data of a physical environment in which a user is located. The physical image data can be provided to a location tracking system operating a simultaneous localization and mapping (SLAM) algorithm to track, for example, a location of the user, an orientation of the user, and/or a path of movement of the user in the physical environment. The image sensors can also be used to generate physical image data including stereo depth information for measuring a distance between the user and an object in the physical environment. The image sensors can also be configured as a near-infrared (NIR) sensor. An illuminator may project a pattern of NIR light into the eyeballs of the user. The internal structures of the eyeballs (e.g., the pupils) may generate a reflective pattern from the NIR light. The image sensors can capture images of the reflective pattern, and provide the images to a system to track the movement of the eyeballs of the user to determine a gaze point of the user. Based on these physical image data, the VR/AR/MR system may generate and update virtual image data for displaying to the user via the near-eye display, to provide an interactive experience to the user. For example, the VR/AR/MR system may update the virtual image data based the user's gazing direction (which may signal the user's interest in the object), a location of the user, etc.

A wearable VR/AR/MR system may operate in environments with a very wide range of light intensities. For example, the wearable VR/AR/MR system may be able to operate in an indoor environment or in an outdoor environment, and/or at different times of the day, and the light intensity of the operation environment of the wearable VR/AR/MR system may vary substantially. Moreover, the wearable VR/AR/MR system may also include the aforementioned NIR eyeball tracking system, which may require projecting lights of very low intensity into the eyeballs of the user to prevent damaging the eyeballs. As a result, the image sensors of the wearable VR/AR/MR system may need to have a wide dynamic range to be able to operate properly (e.g., to generate an output that correlates with the intensity of incident light) across a very wide range of light intensities associated with different operating environments. The image sensors of the wearable VR/AR/MR system may also need to generate images at sufficient high speed to allow tracking of the user's location, orientation, gaze point, etc. Image sensors with relatively limited dynamic ranges and which generate images at relatively low speed may not be suitable for such a wearable VR/AR/MR system.

This disclosure relates to a pixel cell that can provide extended dynamic range and improved processing speed. The pixel cell may include a photodiode, a first charge storage unit, a second charge storage unit, a transfer gate between the first charge storage unit and the second charge storage unit, and an analog to digital converter (ADC) circuit. Both the first charge storage unit and the second charge storage unit are capable of storing charges generated by the photodiode, whereas the transfer gate can control a flow of charges from the first charge storage unit to the second charge storage unit. For example, the transfer gate can be controlled with a bias voltage such that, when the photodiode generates charges due to exposure to incident light, the charges are first accumulated at the first charge storage unit as residual charges until the voltage developed at the first charge storage unit exceeds a threshold set by the bias voltage. When the voltage developed at the first charge storage unit exceeds the threshold, additional charges (generated by the photodiode) can move to the second charge storage unit as overflow charges via the transfer gate. The first charge storage unit may be a device capacitor of the photodiode. The second charge storage unit may be a device capacitor of the transfer gate, a metal capacitor, a Metal-Oxide-Semiconductor (MOS) capacitor, or any combination thereof. The second charge storage unit typically has a much larger capacity than the first charge storage unit.

The pixel cell is operable to perform light intensity measurement under a plurality of modes of measurements, with different modes of measurements targeted for different light intensity ranges. In a first mode of measurement targeted for a low light intensity range for which the first charge storage unit is not expected to reach full capacity, the ADC can be operated to measure a quantity of the residual charges stored in the first charge storage unit to determine the light intensity. In a second mode of measurement targeted for a medium light intensity range for which the first charge storage unit is expected to reach full capacity, the ADC can be operated to measure a quantity of the overflow charges stored in the second charge storage unit to determine the light intensity. Moreover, in a third mode of measurement targeted for a high light intensity range for which both the first charge storage unit and the second charge storage unit are expected to reach full capacity, the ADC can be operated to measure a rate of accumulation of the overflow charges at the second charge storage unit to determine the light intensity.

The disclosed techniques can extend the dynamic range of the pixel cell for both the low light intensity measurement and the high light intensity measurement, and generate the digital outputs representing the measurements. For example, the rate of accumulation of the overflow charges (for the high light intensity range) provides a reasonably accurate representation of the light intensity, which enables the light intensity to be measured even when the second charge storage unit reaches the capacity limit. Therefore, the upper limit of the measurable light intensity of the image sensor can increase, and the dynamic range can be extended.

Moreover, determining light intensity based on measuring the residual charges stored at the device capacitor of the photodiode, for the low light intensity range, can also improve the accuracy of the light intensity determination. As discussed above, photodiodes typically generate less dark current than other semiconductor devices. Therefore, by determining light intensity based on measuring the residual charges stored at the device capacitor of the photodiode, the effect of dark current on the accuracy of residual charges measurement (and the light intensity determination) can be reduced. Therefore, fewer noise charges (e.g., due to dark current) are introduced, which in turn lowers the lower limit of the measureable light intensity of the image sensor and further extends the dynamic range. Other techniques are disclosed, such as variable charge-to-voltage conversion ratios, non-uniform quantization, etc., to further improve the accuracy of light intensity determination, especially for the low intensity light range.

Further, by providing an ADC in a pixel cell, each pixel cell of a pixel array can be exposed to incident lights and generate digital representations of the incident light intensity received at the pixel cell simultaneously, to provide a global shutter operation. For high speed motion capture, global shutter is advantageous as it avoids the motion distortion problem associated with rolling shutter operation caused by rows of pixel cells capturing images of different parts of a moving object at different times. Further, compared with the conventional approach where rows of pixel cells take turns in being exposed and generating intensity data, the processing time for image generation using the pixel cell can be reduced. Therefore, the disclosed techniques not only extend the dynamic range but also increase the operation speed of the pixel cell, and can also improve the performance of an application (e.g., a VR/AR/MR system) that relies on the digital output of the pixel cell, as well as user experience.

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an embodiment of a near-eye display 100. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images to an eye of the user.

Near-eye display 100 further includes image sensors 120a, 120b, 120c, and 120d. Each of image sensors 120a, 120b, 120c, and 120d may include a pixel array configured to generate image data representing different fields of views along different directions. For example, sensors 120a and 120b may be configured to provide image data representing two field of views towards a direction A along the Z axis, whereas sensor 120c may be configured to provide image data representing a field of view towards a direction B along the X axis, and sensor 120d may be configured to provide image data representing a field of view towards a direction C along the X axis.

In some embodiments, sensors 120a-120d can be configured as input devices to control or influence the display content of the near-eye display 100, to provide an interactive VR/AR/MR experience to a user who wears near-eye display 100. For example, sensors 120a-120d can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120a-120d can provide the location tracking system a more holistic view of the physical environment, which can lead to more objects to be included in the construction and updating of the map. With such arrangement, the accuracy and robustness of tracking a location of the user within the physical environment can be improved.

In some embodiments, near-eye display 100 may further include one or more active illuminator 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120a-120d in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of sensors 120a or 120b can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

FIG. 2 is an embodiment of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some embodiments, near-eye display 100 includes one or more optical elements between waveguide display assembly 210 and eyeball 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
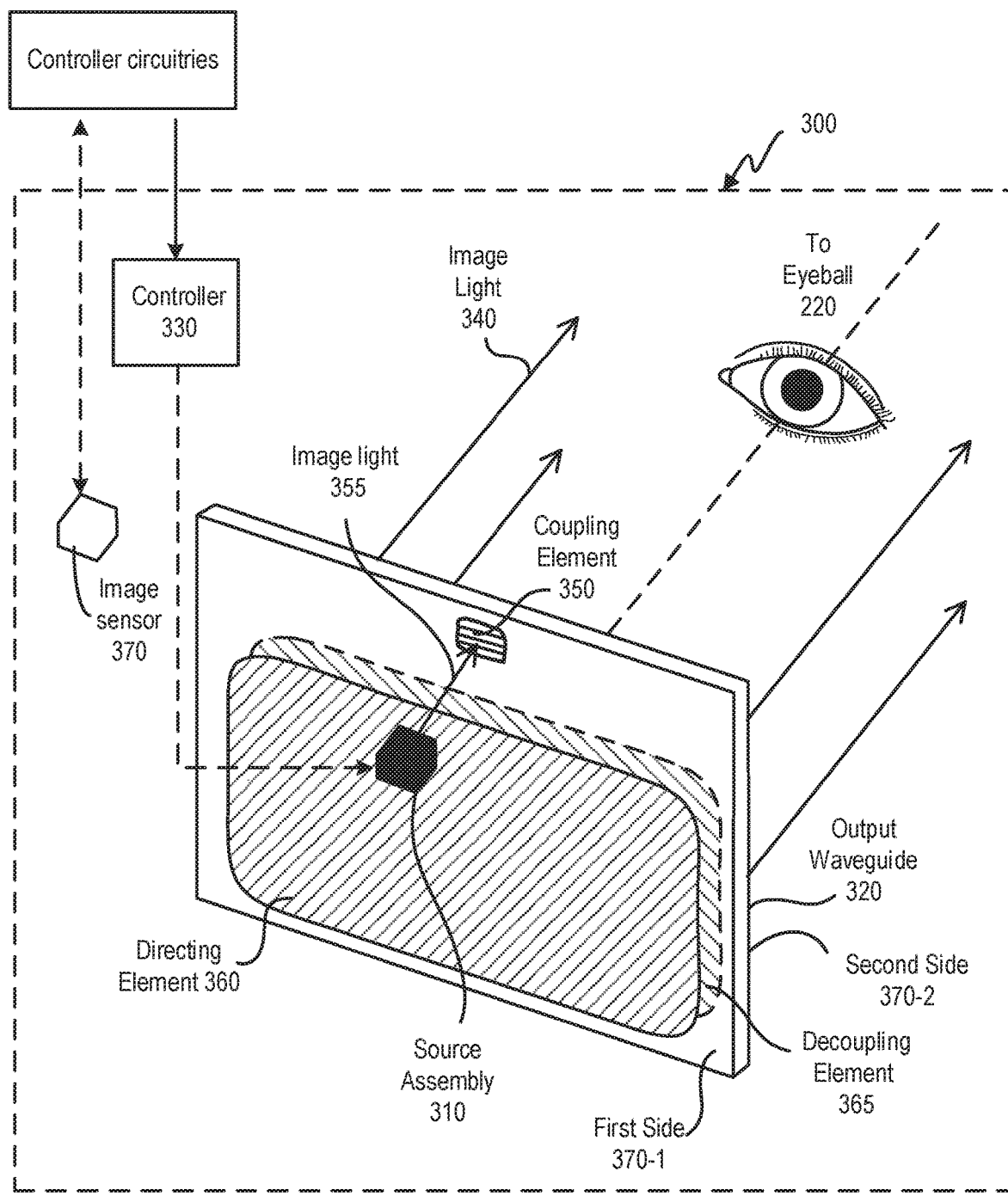
FIG. 3 illustrates an isometric view of an embodiment of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some embodiments, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 330 controls scanning operations of source assembly 310. The controller 330 determines scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 330 also controls image light 355 generated by source assembly 310, based on image data provided by image sensor 370. Image sensor 370 may be located on first side 370-1 and may include, for example, image sensors 120a-120d of FIG. 1A to generate image data of a physical environment in front of the user (e.g., for location determination). Image sensor 370 may also be located on second side 370-2 and may include image sensors 150a and 150b of FIG. 1B to generate image data of eyeball 220 (e.g., for gaze point determination) of the user. Image sensor 370 may interface with a remote console that is not located within waveguide display 300. Image sensor 370 may provide image data to the remote console, which may determine, for example, a location of the user, a gaze point of the user, etc., and determine the content of the images to be displayed to the user. The remote console can transmit instructions to controller 330 related to the determined content. Based on the instructions, controller 330 can control the generation and outputting of image light 355 by source assembly 310.

Figure 4:
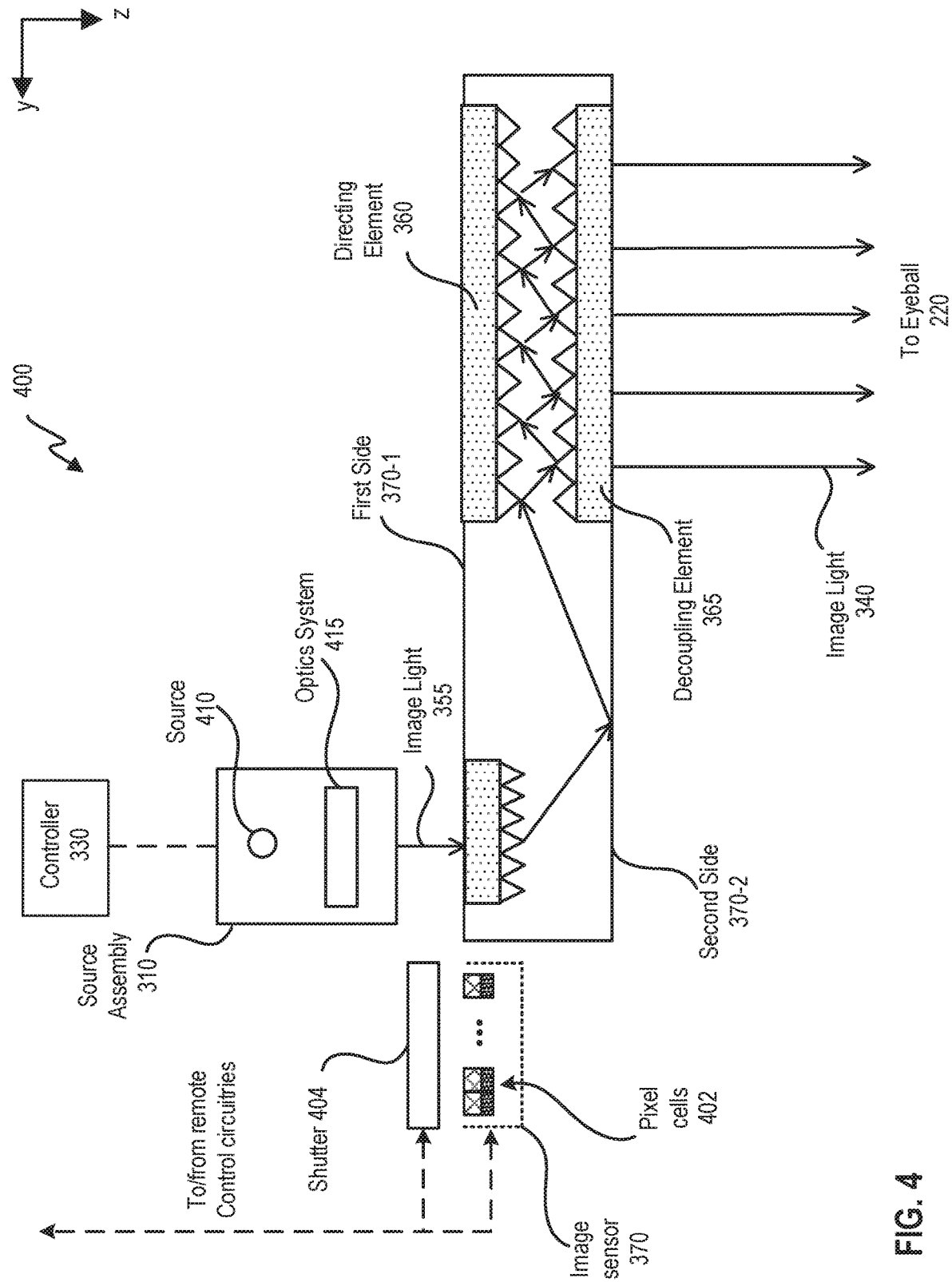
FIG. 4 illustrates a cross section of an embodiment of the waveguide display.

FIG. 4 illustrates an embodiment of a cross section 400 of the waveguide display 300. The cross section 400 includes source assembly 310, output waveguide 320, and image sensor 370. In the example of FIG. 4, image sensor 370 may include a set of pixel cells 402 located on first side 370-1 to generate an image of the physical environment in front of the user. In some embodiments, there can be a mechanical shutter 404 interposed between the set of pixel cells 402 and the physical environment to control the exposure of the set of pixel cells 402. In some embodiments, the mechanical shutter 404 can be replaced by an electronic shutter gate, as to be discussed below. Each of pixel cells 402 may correspond to one pixel of the image. Although not shown in FIG. 4, it is understood that each of pixel cells 402 may also be overlaid with a filter to control the frequency range of the light to be sensed by the pixel cells.

After receiving instructions from the remote console, mechanical shutter 404 can open and expose the set of pixel cells 402 in an exposure period. During the exposure period, image sensor 370 can obtain samples of lights incident on the set of pixel cells 402, and generate image data based on an intensity distribution of the incident light samples detected by the set of pixel cells 402. Image sensor 370 can then provide the image data to the remote console, which determines the display content, and provide the display content information to controller 330. Controller 330 can then determine image light 355 based on the display content information.

Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode.

Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5:
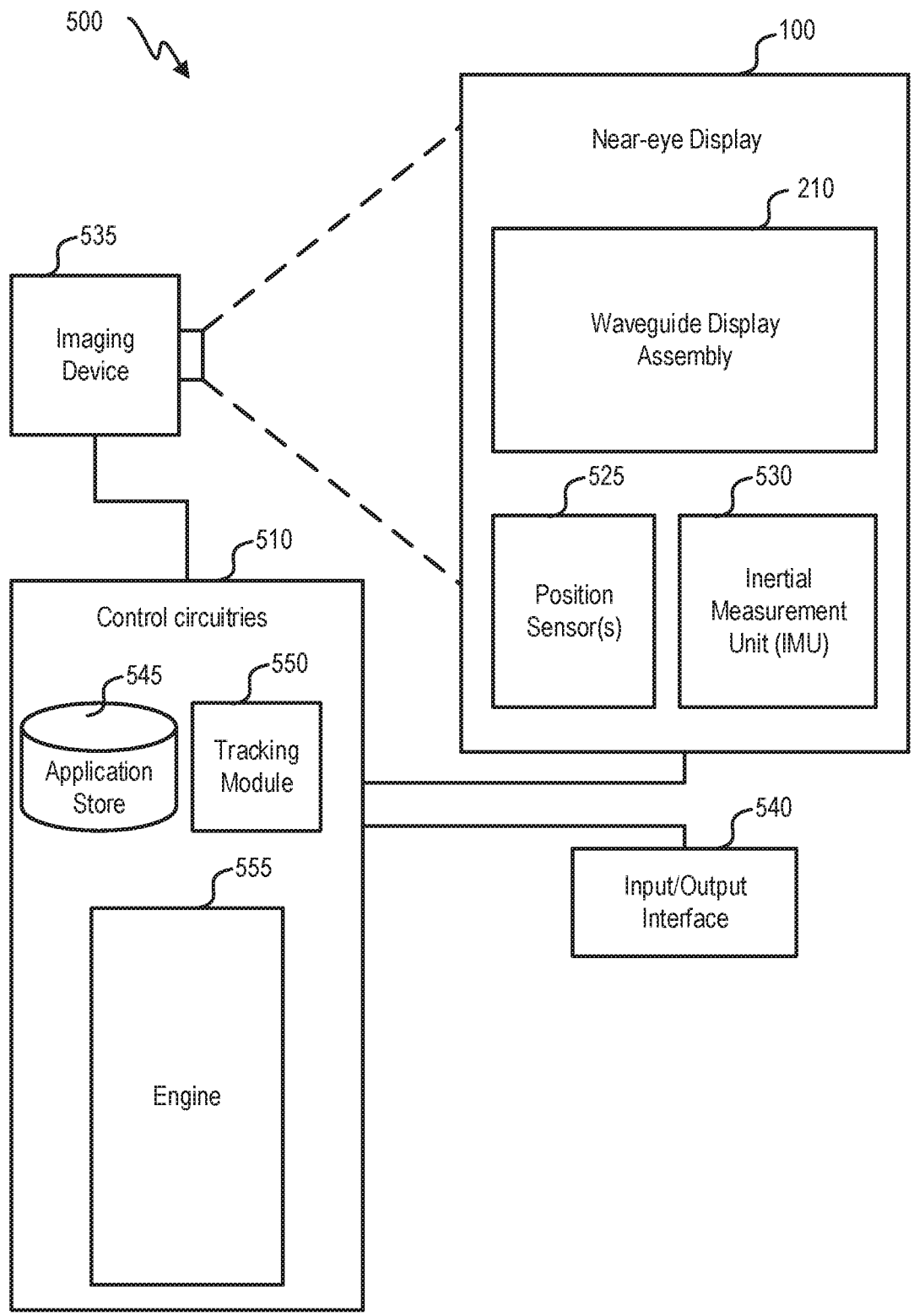
FIG. 5 is a block diagram of an embodiment of a system including the near-eye display.

FIG. 5 is a block diagram of an embodiment of a system 500 including the near-eye display 100. The system 500 comprises near-eye display 100, an imaging device 535, an input/output interface 540, and image sensors 120a-120d and 150a-150b that are each coupled to control circuitries 510. System 500 can be configured as a head-mounted device, a wearable device, etc.

Near-eye display 100 is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound, etc.).

Near-eye display 100 includes waveguide display assembly 210, one or more position sensors 525, and/or an inertial measurement unit (IMU) 530. Waveguide display assembly 210 includes source assembly 310, output waveguide 320, and controller 330.

IMU 530 is an electronic device that generates fast calibration data indicating an estimated position of near-eye display 100 relative to an initial position of near-eye display 100 based on measurement signals received from one or more of position sensors 525.

Imaging device 535 may generate image data for various applications. For example, imaging device 535 may generate image data to provide slow calibration data in accordance with calibration parameters received from control circuitries 510. Imaging device 535 may include, for example, image sensors 120a-120d of FIG. 1A for generating image data of a physical environment in which the user is located, for performing location tracking of the user. Imaging device 535 may further include, for example, image sensors 150a-150b of FIG. 1B for generating image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provides media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5, control circuitries 510 include an application store 545, a tracking module 550, and an engine 555.

The application store 545 stores one or more applications for execution by the control circuitries 510. An application is a group of instructions, that, when executed by a processor, generates content for presentation to the user. Examples of applications include: gaming applications, conferencing applications, video playback application, or other suitable applications.

Tracking module 550 calibrates system 500 using one or more calibration parameters and may adjust one or more calibration parameters to reduce error in determination of the position of the near-eye display 100.

Tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), a gaze point of the user (e.g., based on image data provided by imaging device 535), a distance between an object and user (e.g., based on image data provided by imaging device 535).

Figure 6:
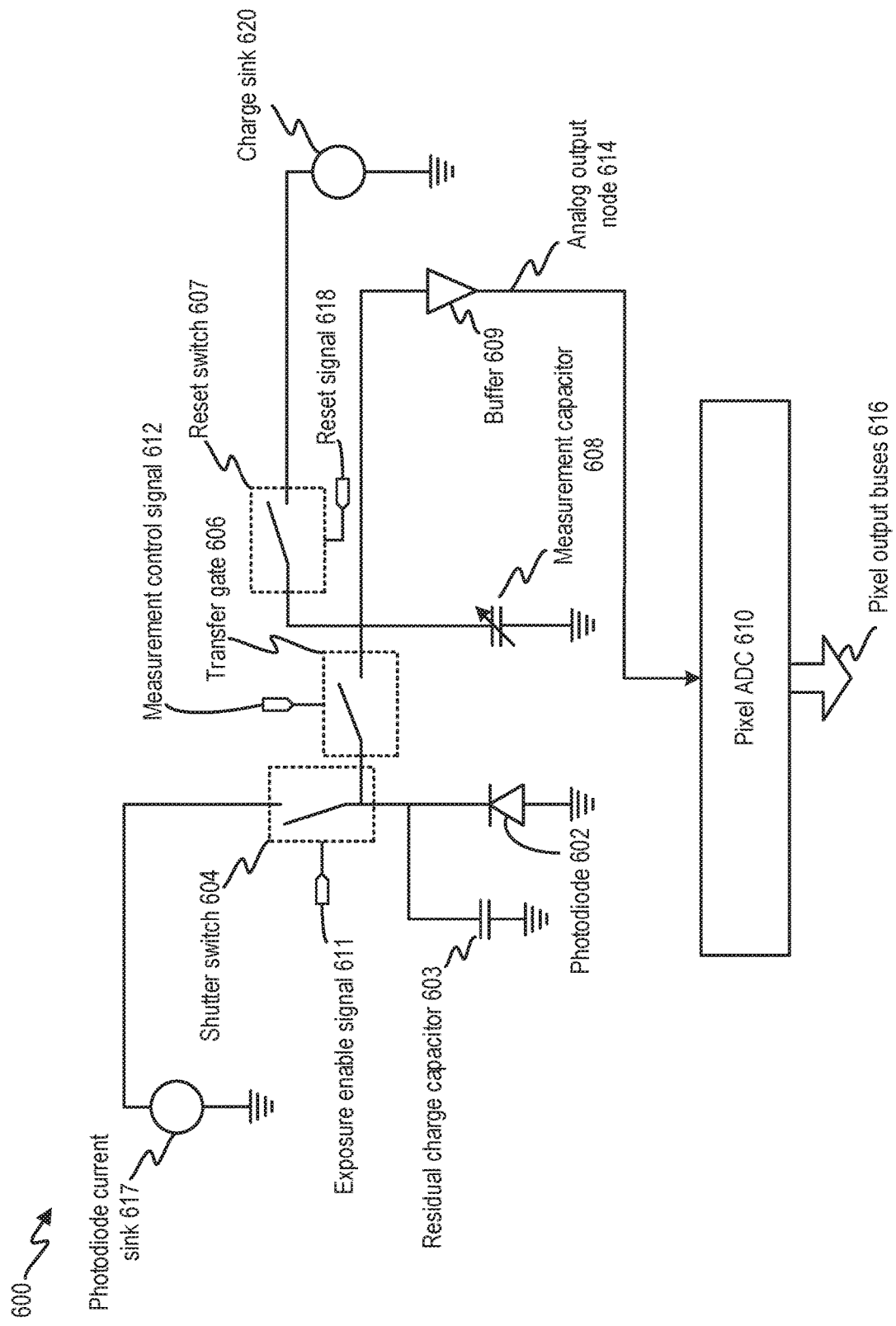
FIG. 6 illustrates block diagrams of embodiments of a pixel cell.

FIG. 6 illustrates an example of a pixel cell 600. Pixel cell 600 may be part of a pixel array and can generate digital intensity data corresponding to a pixel of an image. For example, pixel cell 600 may be part of pixel cells 402 of FIG. 4. As shown in FIG. 6, pixel cell 600 may include a photodiode 602, a residual charge capacitor 603, a shutter switch 604, a transfer gate 606, a reset switch 607, a measurement capacitor 608, a buffer 609, and a pixel ADC 610.

In some embodiments, photodiode 602 may include a P-N diode or a P-I-N diode. Each of shutter switch 604, transfer gate 606, and reset switch 607 can include a transistor. The transistor may include, for example, a metal-oxide-semiconductor field-effect transistor (MOSFET), a bipolar junction transistor (BJT), etc. Shutter switch 604 can act as an electronic shutter gate (in lieu of, or in combination with, mechanical shutter 404 of FIG. 4) to control an exposure period of pixel cell 600. During the exposure period, shutter switch 604 can be disabled (turned off) by exposure enable signal 611, which allows charges generated by photodiode 602 to move to residual charge capacitor 603 and/or measurement capacitor 608. At the end of the exposure period, shutter switch 604 can be enabled to steer the charges generated by photodiode 602 into photodiode current sink 617. Moreover, reset switch 607 can also be disabled (turned off) by reset signal 618, which allows measurement capacitor 608 to accumulate the charges and develop a voltage that reflects a quantity of the accumulated charges. After a mode of measurement completes, reset switch 607 can be enabled to empty the charges stored at measurement capacitor 608 to charge sink 620, to make measurement capacitor 608 available for the next measurement.

Residual charge capacitor 603 can be a device capacitor of photodiode 602 and can store charges generated by photodiode 602. Residual charge capacitor 603 can include, for example, a junction capacitor at the P-N diode junction interface, or other device capacitor(s) connected to photodiode 602. Due to the proximity of residual charge capacitor 603 to photodiode 602, charges generated by photodiode 602 may be accumulated at charge capacitor 603. Measurement capacitor 608 can be a device capacitor at a floating terminal of transfer gate 606, a metal capacitor, a MOS capacitor, or any combination thereof. Measurement capacitor 608 can be used to store a quantity of charges, which can be measured by pixel ADC 610 to provide a digital output representing the incident light intensity. The charges stored at measurement capacitor 608 can be either overflow charges (from photodiode 602) that are not to be accumulated at residual charge capacitor 603, or residual charges that are emptied from residual charge capacitor 603.

Figure 7:
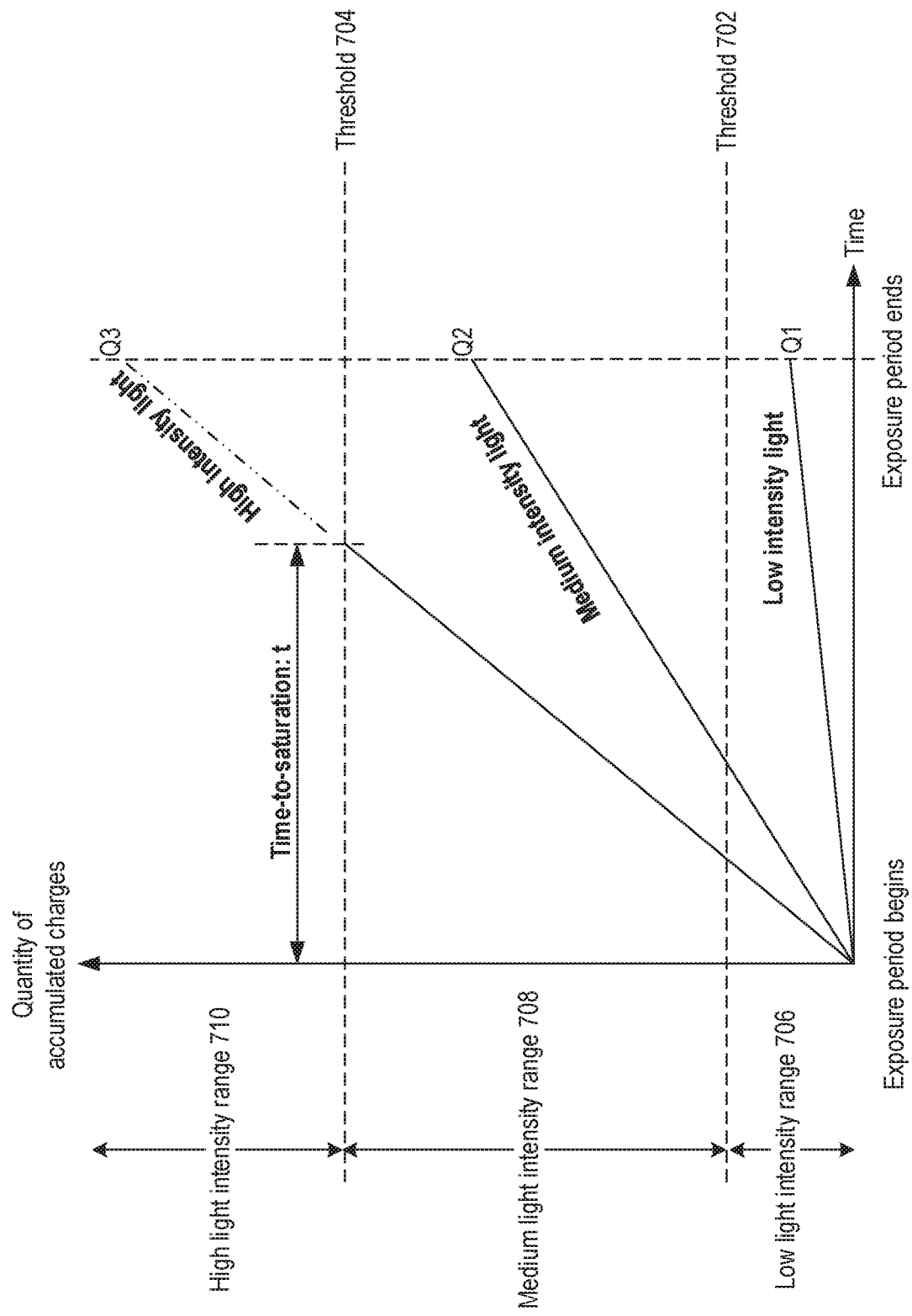
FIG. 7 illustrates operations for determining light intensities of different ranges by embodiments of FIG. 6.

Reference is now made to FIG. 7, which illustrates the charge accumulation operations at residual charge capacitor 603 and measurement capacitor 608 for different target light intensity ranges. FIG. 7 illustrates a total quantity of charges accumulated (or expected to accumulate) at residual charge capacitor 603 and measurement capacitor 608 with respect to time for different light intensity ranges. The total quantity of charges accumulated can reflect the total charges generated by photodiode 602 during an exposure period, which in turns reflects the intensity of light incident upon photodiode 602 during the exposure period. The quantity can be measured when the exposure period ends. A threshold 702 and a threshold 704 can be defined for thresholds quantity of charges defining a low light intensity range 706, a medium light intensity range 708, and a high light intensity range 710 for the intensity of the incident light. For example, if the total accumulated charges is below threshold 702 (e.g., Q1), the incident light intensity is within low light intensity range 706. If the total accumulated charges is between threshold 704 and threshold 702 (e.g., Q2), the incident light intensity is within medium light intensity range 708. If the total accumulated charges is above threshold 704, the incident light intensity is within medium light intensity range 710.

Thresholds 702 and 704 can be set to control the accumulation of charges at residual charge capacitor 603 and measurement capacitor 608, to ensure that the quantity of accumulated charges at the capacitors correlates with the incident light intensity when the incident light intensity falls within either low light intensity range 706 or medium light intensity range 708. For example, thresholds 702 and 704 can be set below the capacities of residual charge capacitor 603 and measurement capacitor 608. As discussed above, once residual charge capacitor 603 and measurement capacitor 608 reaches full capacity, the capacitors may start leaking charges, and the voltage developed at the capacitors may not accurately represent or reflect the total number of charges generated by photodiode 602 during the exposure period. By setting thresholds 702 and 704 to below the capacities of residual charge capacitor 603 and measurement capacitor 608, measurement error caused by charge leakage can be avoided. In some examples, threshold 702 can be set at 2000e– (2000 charges), whereas threshold 704 can be set at 63000e– (63000 charges).

The accumulation of charges at residual charge capacitor 603 and measurement capacitor 608 can be controlled by thresholds 702 and 704. For example, an incident light intensity falling within low light intensity range 706 can be based on the total charges accumulated at residual charge capacitor 603. Assuming residual charge capacitor 603 is not yet full at the end of the exposure period, the total charges accumulated at residual charge capacitor 603 can reflect the total charges generated by photodiode 602 during the exposure period, and can be used to determine the incident light intensity. When the total charges accumulated at residual charge capacitor 603 exceeds threshold 702, the additional charges generated by photodiode 602 can be diverted to measurement capacitor 608 as overflow charges. Assuming measurement capacitor 608 is not yet full at the end of the exposure period, the total overflow charges accumulated at measurement capacitor 608 can also reflect the total charges generated by photodiode 602 during the exposure period, and can be used to determine the incident light intensity (which falls within medium light intensity range 708).

On the other hand, in a case where the incident light intensity is within high light intensity range 710, the total overflow charges accumulated at measurement capacitor 608 may exceed threshold 704 before the exposure period ends. As additional charges are accumulated, measurement capacitor 608 may reach full capacity before the end of the exposure period, and charge leakage may occur. To avoid measurement error caused due to measurement capacitor 608 reaching full capacity, a time-to-saturation measurement can be performed to measure the time duration it takes for the total overflow charges accumulated at measurement capacitor 608 to reach threshold 704. A rate of charge accumulation at measurement capacitor 608 can be determined based on a ratio between threshold 704 and the time-to-saturation, and a hypothetical quantity of charge (Q3) that could have been accumulated at measurement capacitor 608 at the end of the exposure period (if the capacitor had limitless capacity) can be determined by extrapolation according to the rate of charge accumulation. The hypothetical quantity of charge (Q3) can provide a reasonably accurate representation of the incident light intensity within high light intensity range 710.

Referring back to FIG. 6, transfer gate 606 can be controlled by a measurement control signal 612 to control the charge accumulations at residual charge capacitor 603 and measurement capacitor 608 for different light intensity ranges as described above. For example, for low light intensity range 706, transfer gate 606 can be controlled to operate in a partially turned-on state. During the exposure period, the gate voltage of transfer gate 606 can set based on a voltage developed at residual charge capacitor 603 when the total accumulated charges at residual charge capacitor 603 reaches threshold 702. With such arrangements, the charges generated by photodiode 602 will be stored in residual charge capacitor 603 first until the quantity of accumulated charges reaches threshold 702. Right before the exposure period ends, transfer gate 606 can be controlled to operate in a fully turned-on state to move the charges stored in residual charge capacitor 603 to measurement capacitor 608. At the end of the charge transfer, transfer gate 606 can be controlled to operate in a fully turned-off state to preserve the charges stored in measurement capacitor 608. At that point, the charges stored in measurement capacitor 608 may represent the charges stored in residual charge capacitor 603, and can be used to determine the incident light intensity. On the other hand, for medium light intensity range 708 and high light intensity range 710, the overflow charges accumulated at measurement capacitor 608 can also be measured right before the exposure period ends, when the transfer gate 606 is still in a partially turned-on state and the charges stored in residual charge capacitor 603 are not yet transferred to measurement capacitor 608.

The charges accumulated at measurement capacitor 608 can be sensed by buffer 609 to generate a replica of the analog voltage (but with larger driving strength) at analog output node 614. The analog voltage at analog output node 614 can be converted into a set of digital data (e.g., comprising logical ones and zeros) by pixel ADC 610. The analog voltage developed at measurement capacitor 608 can be sampled and digital output can be generated before the end of the exposure period (e.g., for medium light intensity range 708 and high light intensity range 710), or after the exposure period (for low light intensity range 706). The digital data can be transmitted by a set of pixel output buses 616 to, for example, control circuitries 510 of FIG. 5, to represent the light intensity during the exposure period.

In some examples, the capacitance of measurement capacitor 608 can be configurable to improve the accuracy of light intensity determination for low light intensity range. For example, the capacitance of measurement capacitor 608 can be reduced when measurement capacitor 608 is used to measure the residual charges stored at residual charge capacitor 603. The reduction in the capacitance of measurement capacitor 608 can increase the charge-to-voltage conversion ratio at measurement capacitor 608, such that a higher voltage can be developed for a certain quantity of stored charges. The higher charge-to-voltage conversion ratio can reduce the effect of measurement errors (e.g., quantization error, comparator offset, etc.) introduced by pixel ADC 610 on the accuracy of low light intensity determination. The measurement error can set a limit on a minimum voltage difference that can be detected and/or differentiated by pixel ADC 610. By increasing the charge-to-voltage conversion ratio, the quantity of charges corresponding to the minimum voltage difference can be reduced, which in turn reduces the lower limit of a measurable light intensity by pixel cell 600 and extends the dynamic range. On the other hand, for medium light intensity, the capacitance of measurement capacitor 608 can be increased to ensure that the measurement capacitor 608 has sufficient capacity to store a quantity of charges up to, for example, the quantity defined by threshold 704.

Figure 8:
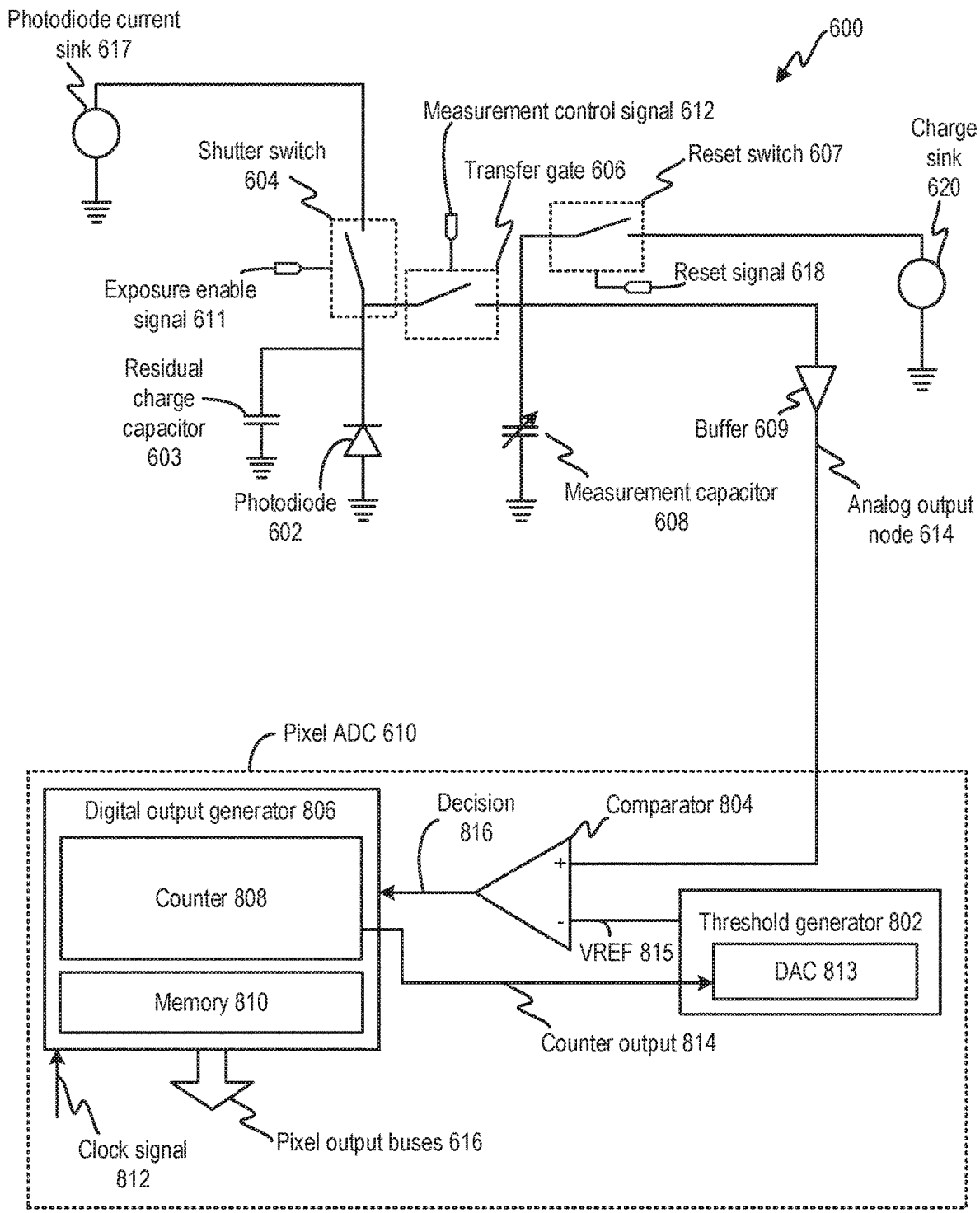
FIG. 8 illustrates examples of internal components of the pixel cell of FIG. 6.

FIG. 8 illustrates an example of the internal components of pixel ADC 610. As shown in FIG. 8, pixel ADC 610 includes a threshold generator 802, a comparator 804, and a digital output generator 806. Digital output generator 806 may further include a counter 808 and a memory device 810. Counter 808 can generate a set of count values based on a free-running clock signal 812, whereas memory 810 can store at least some of the count values (e.g., the latest count value) generated by counter 808. In some embodiments, memory 810 may be part of counter 808. Memory 810 can be, for example, a latch circuit to store the counter value based on local pixel value as described below. Threshold generator 802 includes a digital-to-analog converter (DAC) 813 which can accept a set of digital values and output a reference voltage (VREF) 815 representing the set of digital values. As to be discussed in more detail below, threshold generator 802 may accept static digital values to generate a fixed threshold, or accept output 814 of counter 808 to generate a ramping threshold.

Although FIG. 8 illustrates that DAC 813 (and threshold generator 802) is part of pixel ADC 610, it is understood that DAC 813 (and threshold generator 802) can be coupled with multiple digital output generators 806 from different pixel cells. Moreover, digital output generator 806 can also be shared among a plurality of multiple pixel cells to generate the digital values.

Comparator 804 can compare the analog voltage developed at analog output node 614 against the threshold provided by threshold generator 802, and generate a decision 816 based on the comparison result. For example, comparator 804 can generate a logical one for decision 816 if the analog voltage at analog output node 614 equals to or exceeds the threshold generated by threshold generator 802. Comparator 804 can also generate a logical zero for decision 816 if the analog voltage falls below the threshold. Decision 816 can control the counting operations of counter 808 and/or the count values stored in memory 810, to perform the aforementioned time-of-saturation measurement of a ramping analog voltage at analog output node 614 as well as quantization processing of the analog voltage at analog output node 614 for incident light intensity determination.

Figure 9:
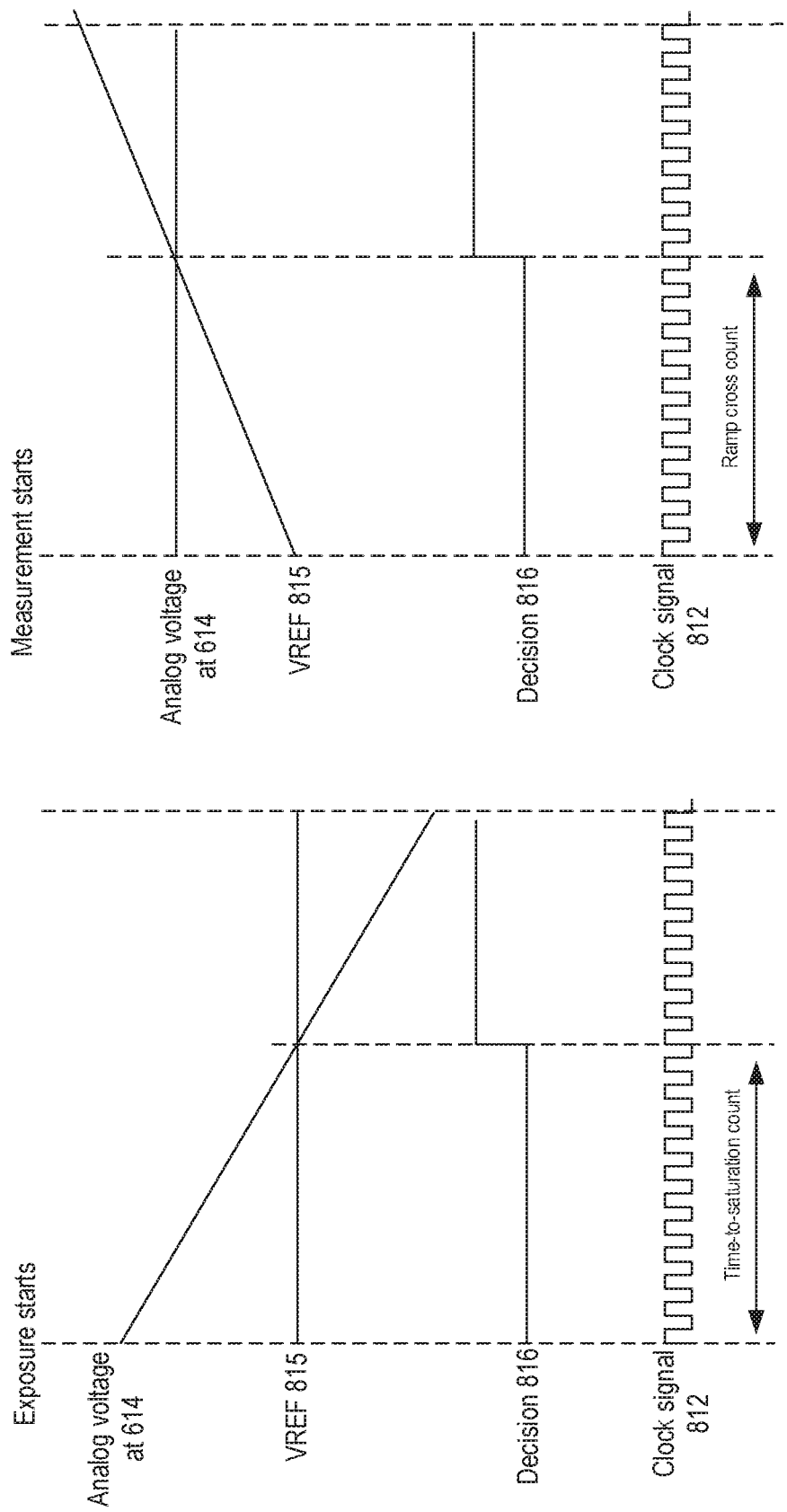
FIGS. 9A and 9B illustrate example methods for determining a light intensity.

FIG. 9A illustrates an example of time-to-saturation measurement by pixel ADC 610. To perform the time-to-saturation measurement, threshold generator 802 can control DAC 813 to generate a fixed VREF 815. Fixed VREF 815 can be set at a voltage corresponding a charge quantity threshold between the medium light intensity range and the high light intensity range (e.g., threshold 704 of FIG. 7). Counter 808 can start counting right after the exposure period starts (e.g., right after shutter switch 604 is disabled). As the analog voltage at analog output node 614 ramps down (or up depending on the implementation), clock signal 812 keeps toggling to update the count value at counter 808. The analog voltage may reach the fixed threshold at a certain time point, which causes decision 816 by comparator 804 to flip. The flipping of decision 816 may stop the counting of counter 808, and the count value at counter 808 may represent the time-to-saturation. As to be discussed in more details below, a rate of charge accumulation at measurement capacitor 608 can also be determined based on the duration, and the incident light intensity can be determined based on the rate of charge accumulation.

FIG. 9B illustrates an example of quantizing an analog voltage by pixel ADC 610. After measurement starts, DAC 813 may be programmed by counter output 714 to generate a ramping VREF 815, which can either ramp up (in the example of FIG. 9B) or ramp down depending on implementation. In the example of FIG. 9B, the quantization process can be performed with uniform quantization steps, with VREF 815 increasing (or decreasing) by the same amount for each clock cycle of clock signal 812. The amount of increase (or decrease) of VREF 815 corresponds to a quantization step. When VREF 815 reaches within one quantization step of the analog voltage at analog output node 614, decision 816 by comparator 804 flips. The flipping of decision 816 may stop the counting of counter 808, and the count value can correspond to a total number of quantization steps accumulated to match, within one quantization step, the analog voltage. The count value can become a digital representation of the quantity of charges stored at measurement capacitor 608, as well as the digital representation of the incident light intensity. As discussed above, the quantization of the analog voltage can occur during the exposure period (e.g., for medium light intensity range 708) and after the exposure period (e.g., for low light intensity range 706).

As discussed above, ADC 610 can introduce quantization errors when there is a mismatch between a quantity of charges represented by the quantity level output by ADC 610 (e.g., represented by the total number of quantization steps) and the actual input quantity of charges that is mapped to the quantity level by ADC 610. The quantization error can be reduced by using a smaller quantization step size. In the example of FIG. 9B, the quantization error can be reduced by the amount of increase (or decrease) in VREF 815 per clock cycle.

Although quantization error can be reduced by using smaller quantization step sizes, area and performance speed may limit how far the quantization step can be reduced. With smaller quantization step size, the total number of quantization steps need to represent a particular range of charge quantities (and light intensity) may increase. A larger number of data bits may be needed to represent the increased number of quantization steps (e.g., 8 bits to represent 255 steps, 7 bits to represent 127 steps, etc.). The larger number of data bits may require additional buses to be added to pixel output buses 616, which may not be feasible if pixel cell 600 is used on a head-mounted device or other wearable devices with very limited spaces. Moreover, with a larger number of quantization step size, ADC 610 may need to cycle through a larger number of quantization steps before finding the quantity level that matches (with one quantization step), which leads to increased processing power consumption and time, and reduced rate of generating image data. The reduced rate may not be acceptable for some applications that require high frame rate (e.g., an application that tracks the movement of the eyeball).

Figure 10:
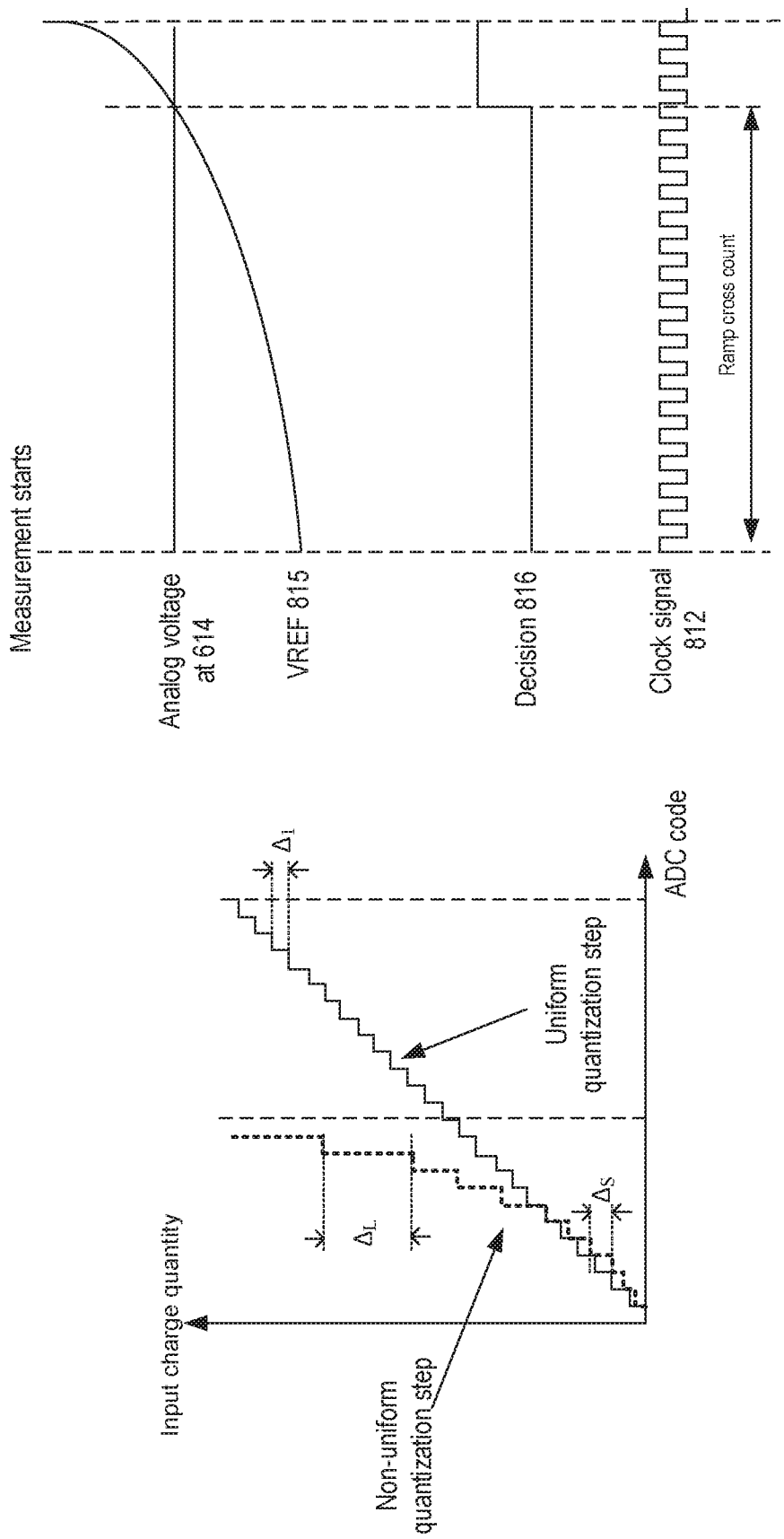
FIGS. 10A and 10B illustrate techniques for performing quantization.

One way to reduce quantization error is by employing a non-uniform quantization scheme, in which the quantization steps are not uniform across the input range. FIG. 10A illustrates an example of a mapping between the ADC codes (the output of the quantization process) and the input charge quantity level for a non-uniform quantization process and a uniform quantization process. The dotted line illustrates the mapping for the non-uniform quantization process, whereas the solid line illustrates the mapping for the uniform quantization process. For the uniform quantization process, the quantization step size (denoted by $\Delta_1$) is identical for the entire range of input charge quantity. In contrast, for the non-uniform quantization process, the quantization step sizes are different depending on the input charge quantity. For example, the quantization step size for a low input charge quantity (denoted by $\Delta_S$) is smaller than the quantization step size for a large input charge quantity (denoted by $\Delta_L$). Moreover, for the same low input charge quantity, the quantization step size for the non-uniform quantization process ($\Delta_S$) can be made smaller than the quantization step size for the uniform quantization process ($\Delta_1$).

One advantage of employing a non-uniform quantization scheme is that the quantization steps for quantizing low input charge quantities can be reduced, which in turn reduces the quantization errors for quantizing the low input charge quantities, and the minimum input charge quantities that can be differentiated by ADC 610 can be reduced. Therefore, the reduced quantization errors can push down the lower limit of the measureable light intensity of the image sensor, and the dynamic range can be increased. Moreover, although the quantization errors are increased for the high input charge quantities, the quantization errors may remain small compared with high input charge quantities. Therefore, the overall quantization errors introduced to the measurement of the charges can be reduced. On the other hand, the total number of quantization steps covering the entire range of input charge quantities may remain the same (or even reduced), and the aforementioned potential problems associated with increasing the number of quantization steps (e.g., increase in area, reduction in processing speed, etc.) can be avoided.

FIG. 10B illustrates an example of quantizing an analog voltage by pixel ADC 610 using a non-uniform quantization process. Compared with FIG. 9B (which employs a uniform quantization process), VREF 815 increases in a non-linear fashion with each clock cycle, with a swallower slope initially and a steeper slope at a later time. The differences in the slopes are attributed to the uneven quantization step sizes. For lower counter count values (which correspond to a lower input quantity range), the quantization steps are made smaller, hence VREF 815 increases at a slower rate. For higher counter count values (which correspond to a higher input quantity range), the quantization steps are made larger, hence VREF 815 increases at a higher rate. The uneven quantization steps in VREF 815 can be introduced using different schemes. For example, as discussed above, DAC 813 is configured to output voltages for different counter count values (from counter 808). DAC 813 can be configured such that the difference in the output voltage between two neighboring counter count values (which defines the quantization step size) is different for different counter count values. As another example, counter 808 can also be configured to generate jumps in the counter count values, instead of increasing or decreasing by the same count step, to generate the uneven quantization steps. In some examples, the non-uniform quantization process of FIG. 10B can be employed for light intensity determination for low light intensity range 706 and medium light intensity range 708.

Figure 11:
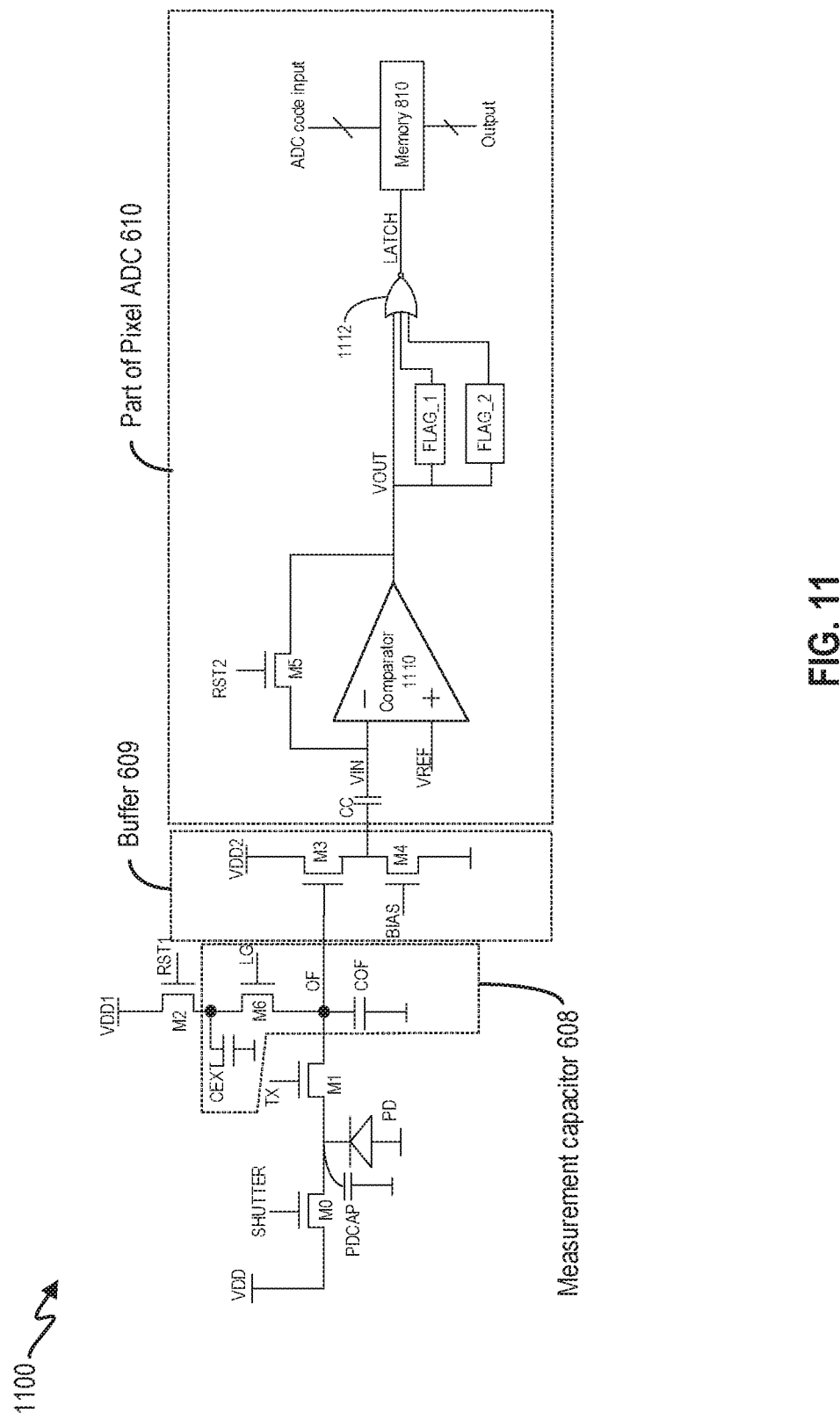
FIG. 11 illustrates block diagrams of an embodiment of a pixel cell.

Reference is now made to FIG. 11, which illustrates an example of pixel cell 1100, which can be an embodiment of pixel cell 600 of FIG. 6. In the example of FIG. 11, PD can correspond to photodiode 602, transistor M0 can correspond to shutter switch 604, transistor M1 can correspond to transfer gate 606, whereas transistor M2 can correspond to reset switch 607. Moreover, PDCAP can correspond to residual charge capacitor 603, whereas a combination of COF and CEXT capacitors can correspond to measurement capacitor 608. The capacitance of measurement capacitor 608 is configurable by the signal LG. When LG is enabled, measurement capacitor 608 provides combined capacities of COF and CEXT capacitors. When LG is disabled, CEXT capacitor can be disconnected from the parallel combination, and measurement capacitor 608 comprises only COF capacitor (plus other parasitic capacitances). As discussed above, the capacitance of measurement capacitor 608 can be reduced to increase the charge-to-voltage conversion ratio for the low light intensity determination, and can be increased to provide the requisite capacity for the medium light intensity determination.

Pixel cell 1100 further includes an example of buffer 609 and an example of pixel ADC 610. For example, transistors M3 and M4 form a source follower which can be buffer 609 of FIG. 6 to buffer an analog voltage developed at the OF node, which represents a quantity of charges stored at the COF capacitor (or at the COF and CEXT capacitors). Further, the CC cap, comparator 1110, transistor M5, NOR gate 1112, together with memory 810, can be part of pixel ADC 610 to generate a digital output representing the analog voltage at the OF node. As described above, the quantization can be based on a comparison result (VOUT), generated by comparator 1110, between the analog voltage developed at the OF node and VREF. Here, the CC cap is configured to generate a VIN voltage (at one input of comparator 1110) which tracks the output of buffer 609, and provides the VIN voltage to comparator 1110 to compare against VREF. VREF can be a static voltage for time-of-saturation measurement (for high light intensity range) or a ramping voltage for quantization of an analog voltage (for low and medium light intensity ranges). The ADC code input can be generated by a free-running counter (e.g., counter 808), and the comparison result generated by comparator 1110 can determine the ADC code input to be stored in memory 810 and to be output as the digital representation of the incident light intensity. In some examples, the generation of VREF for low and medium light intensity determination can be based on a non-uniform quantization scheme as discussed in FIG. 10A and FIG. 10B.

Pixel cell 1100 includes techniques that can further improve the accuracy of the incident light intensity determination, in addition to the techniques disclosed above. For example, the combination of the CC cap and transistor M5 can be used to compensate for measurement errors (e.g., comparator offset) introduced by comparator 1110, as well as other error signals that are introduced to comparator 1110, such that the accuracy of comparator 1110 can be improved. The noise signals may include, for example, reset noise charges introduced by reset switch 607, a noise signal at the output of buffer 609 due to source follower threshold mismatches, etc. A quantity of charges reflecting the comparator offset as well as the error signals can be stored at the CC cap during a reset phase, when both transistors M2 and M5 are enabled. A voltage difference can also be developed across the CC cap during the reset phase due to the stored charges. During a measurement phase, the voltage difference across the CC cap remains, and the CC cap can track the output voltage of buffer 609 by subtracting away (or adding) the voltage difference to generate VIN. As a result, the VIN voltage can be compensated for the measurement errors and the error signals, which improves the accuracy of the comparison between VIN and VREF and the ensuing quantization.

In some examples, pixel cell 1100 can be operated in a three-phase measurement process. Each of the three phases can correspond one of the three light intensity ranges of FIG. 7 (e.g., low light intensity range 706, medium light intensity range 708, and high light intensity range 710). In each phase, pixel cell 1100 can be operated in a measurement mode targeted for the corresponding light intensity range, and determine whether the incident light intensity falls within the corresponding light intensity range based on the output of comparator 1110. If the incident light intensity falls within the corresponding light intensity range, pixel cell 1100 can latch the ADC code input (from counter 808) into memory 810, and put a lock (using a combination of the FLAG_1 and FLAG_2 signals) on memory 810 to prevent subsequent measurement phases from overwriting memory 810. At the end of the three-phase measurement process, the ADC code input stored in memory 810 can then be provided as the digital output representing the incident light intensity.

Figure 12A:
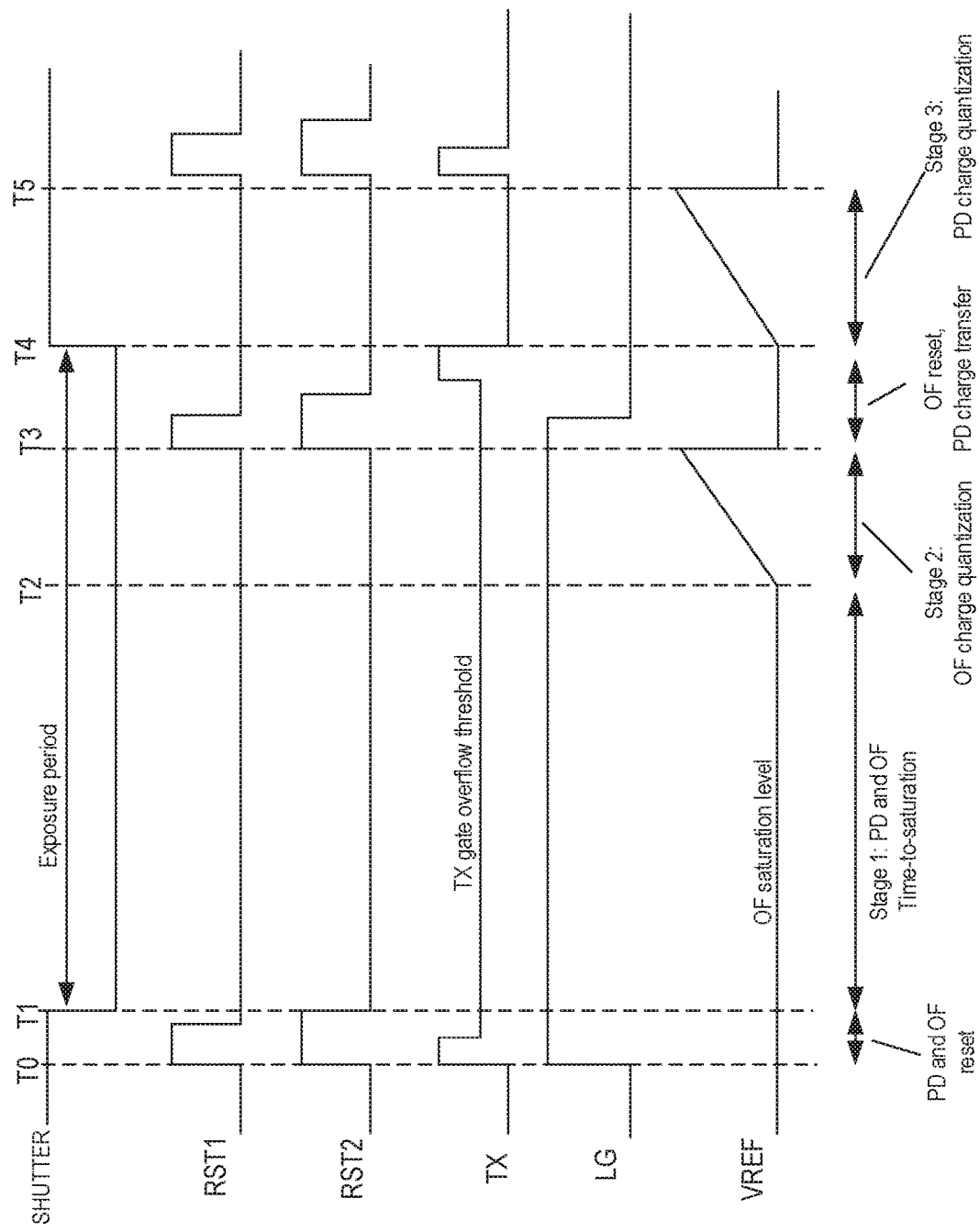

Reference is now made to FIGS. 12A-12D, which illustrate the change of the control signals of pixel cell 1100 for the three-phase measurement process with respect to time. Referring to FIG. 12A, the time period between T0 and T1 corresponds to a first reset phase, whereas the time period between T1 and T4 corresponds to the exposure period. Within the exposure period, the time period between T1 and T2 corresponds to a first phase of measurement for a high light intensity range (e.g., high light intensity range 710), the time period between T2 and T3 corresponds to a second phase of measurement for a medium light intensity range (e.g., medium light intensity range 708), whereas the time period between T3 and T4 corresponds to a second reset phase. Moreover, the time period between T4 and T5 corresponds to a third phase of measurement for a low light intensity range (e.g., low light intensity range 706). Pixel cell 1100 can provide the digital output representing the incident light intensity at time T5, and then start the next three-phase measurement process.

As shown in FIG. 12A, during the time period between T0 and T1 both RST1 and RST2 signals, as well as the LG signal, the TX signal, and the shutter signal, are asserted. As a result, the charges stored in the PDCAP capacitor, the CEXT capacitor, and the COF capacitor are removed. Moreover, no charges are added to the capacitors because the charges generated by photodiode PD are diverted away by transistor M0. Further, comparator 1110 is also in a reset phase, and the CC capacitor can store charges reflecting the reset noise introduced by M2, the comparator offset, the threshold mismatch of buffer 609, etc. Towards the end of the period, the TX gate is biased at a threshold level to trap a pre-determined number of charges (e.g., threshold 702) at PDCAP. The threshold level can be set based on a voltage corresponding to the pre-determined number of charges.

During the time period between T1 and T2, the shutter signal is de-asserted and the LG signal remains asserted, which allow the charges generated by the PD photodiode to flow into the PD capacitor and, if the voltage developed at the PD capacitor exceeds the threshold level set by TX, to flow into the COF capacitor and the CEXT capacitor. FIG. 12B illustrates the measurement operations performed by ADC 610 during that time period. As shown in FIG. 12B, ADC 610 can perform the time-to-saturation measurement, and the buffered and error-compensated version of analog voltage at the OF node (VIN) can be compared against a threshold voltage representing a quantity of charges of threshold 704 while counter 808 is free-running. If the total charges stored at the COF capacitor and the CEXT capacitor exceeds threshold 704 (based on the OF node voltage), comparator 1110 will trip, and the count value generated by counter 808 at the time of tripping can be stored into memory 810. The tripping of comparator 1110 also causes a register storing FLAG_1 to store a value of 1. The non-zero FLAG_1 value can cause the output of NOR gate 1112 to remain low regardless of other inputs to the NOR gate, and can lock the memory and prevent subsequent measurement phases from overwriting counter 808. On the other hand, if comparator 1110 never trips during the time period between T1 and T2, which indicates that the incident light intensity is below the high light intensity range, FLAG_1 stays zero. FLAG_2, which can be updated by subsequent measurement phases, stays at zero regardless of whether comparator 1110 trips.

During the time period between T2 and T3, which corresponds to the second phase of measurement, the analog voltage at the OF node can be quantized by ADC 610. FIG. 12C illustrates the measurement operations performed by ADC 610 during that time period. As shown in FIG. 12C, a ramping VREF can be supplied to comparator 1110 to be compared against the buffered and error-compensated version of analog voltage at the OF node (VIN). Although FIG. 12C shows a ramping VREF corresponding to a uniform quantization process, it is understood that the ramping VREF can also include non-uniform slopes corresponding to a non-uniform quantization process as described with respect to FIG. 10B. The second phase of measurement ends at T3, by which time the ADC input codes representing the entire medium incident light range have been cycled through. If the ramping VREF matches VIN (within one quantization step), comparator 1110 will trip, and the count value generated by counter 808 at the time of tripping can be stored into memory 810, if the memory is not locked by the first phase of measurement (as indicated by the zero value of FLAG_1). If the memory is locked, the count value will not be stored into memory 810. On the other hand, if the memory is not locked, the count value generated by counter 808 at the time of tripping can be stored into memory 810, and the memory can be locked by writing a value of 1 to a register storing FLAG_2.

At the beginning of the time period between T3 and T4, both RST1 and RST2 signals can be asserted again for a second reset phase. The purpose of the second reset phase is to reset the CEXT and COF capacitors, and to prepare the COF capacitor for storing charges transferred from the PDCAP capacitor in the third phase of measurement (for low light intensity range). The LG signal can also be de-asserted to disconnect the CEXT capacitor from the COF capacitor and to reduce the capacitance of measurement capacitor 608. The reduction of the capacitance is to increase the charge-to-voltage conversion ratio to improve the low light intensity determination, as discussed above. Comparator 1110 is also put into the reset state where the CC cap can be used to store the noise charges generated by the resetting of the CEXT and COF capacitors. Towards time T4, after the resetting completes, the RST1 and RST2 signals are de-asserted, whereas the bias TX can increase to fully turn on transistor M1. The charges stored in the PD cap can then move into the COF capacitor via M1.

Figure 12D:
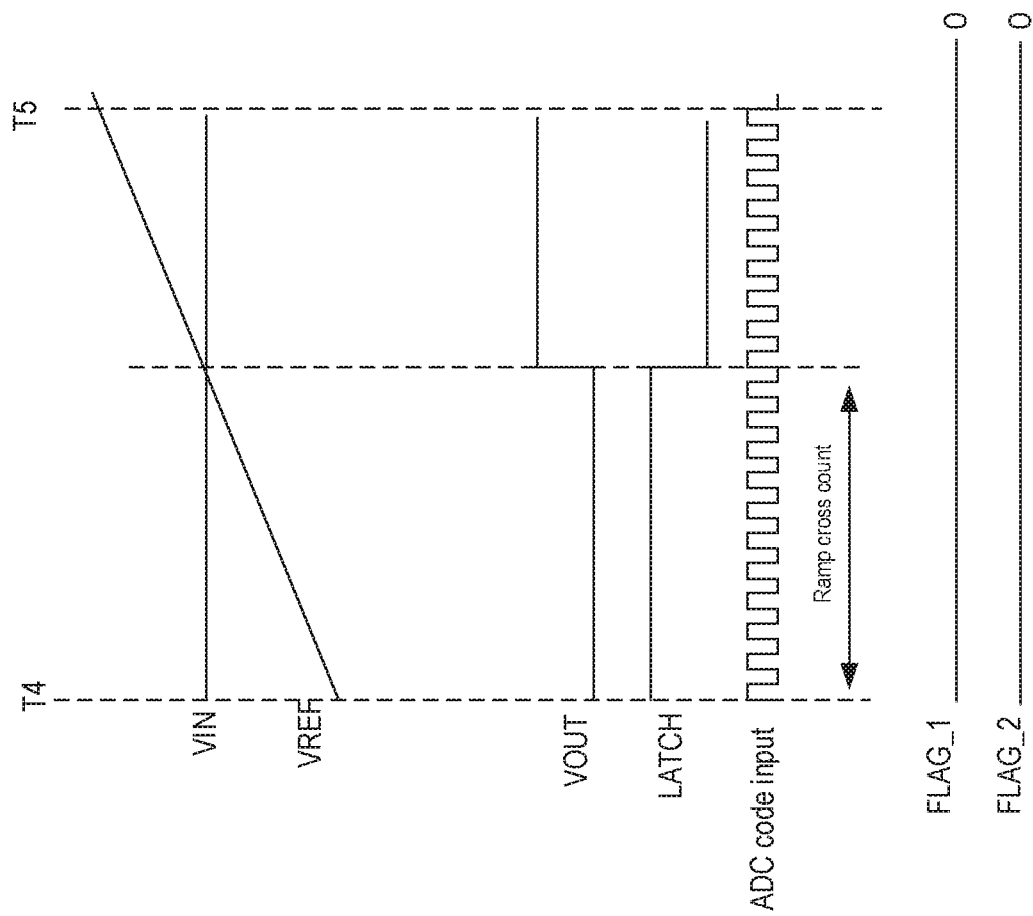

During the time period between T4 and T5, the third phase of measurement is performed for the low light intensity range. During that period, the shutter signal is asserted to end the exposure period, whereas the TX signal is de-asserted to disconnect the PDCA capacitor and the PD photodiode from the COF capacitor, to ensure that that the COF capacitor, during the time of measurement, only stores the charges stored in the PDCAP capacitor during the exposure period. FIG. 12D illustrates the measurement operations performed by ADC 610 during that time period. As shown in FIG. 12D, a ramping VREF can be supplied to comparator 1110 to be compared against the buffered and error-compensated version of analog voltage at the OF node (VIN). Although FIG. 12D shows a ramping VREF corresponding to a uniform quantization process, it is understood that the ramping VREF can also include non-uniform slopes corresponding to a non-uniform quantization process as described with respect to FIG. 10B. The third phase of measurement ends at T5, by which time the ADC input codes representing the entire low incident light range have been cycled through. As shown in FIG. 12D, if the ramping VREF matches VIN (within one quantization step), comparator 1110 will trip, and the count value generated by counter 808 at the time of tripping can be stored into memory 810, if the memory is not locked by the first and second phases of measurement (as indicated by the zero values of FLAG_1 and FLAG_2). If the memory is locked, the count value will not be stored into memory 810. The count value stored in memory 810 can then be provided as a digital output representing the incident light intensity.

Figure 13:
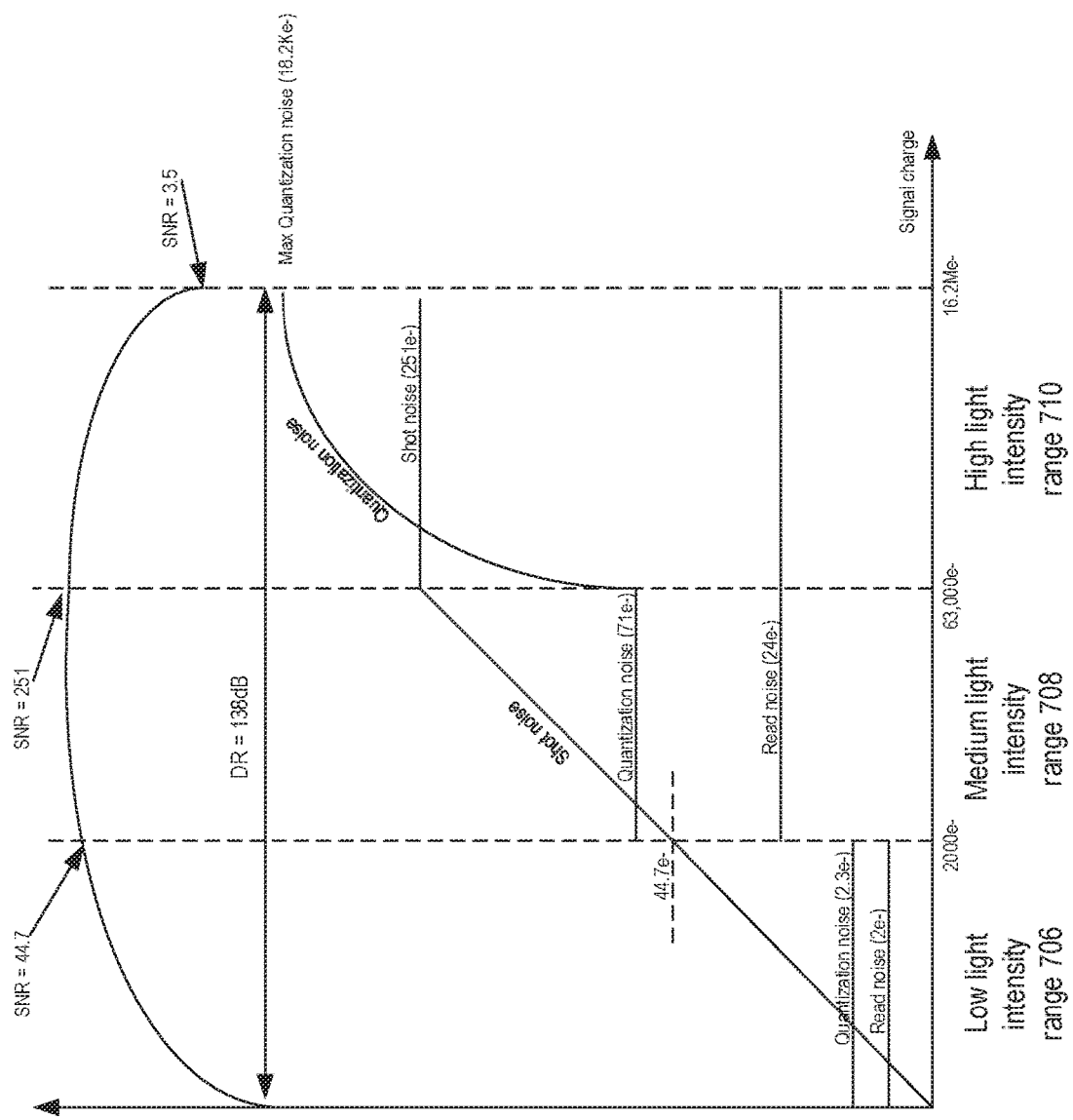
FIG. 13 illustrates an example plot of signal-to-noise ratios across a set of incident light intensity ranges achievable by embodiments of the present disclosure.

FIG. 13 is an example plot of signal-to-noise ratios across a set of incident light intensity ranges achievable by embodiments of the present disclosure. The signal-to-noise ratio (SNR) can be determined based on a ratio between a signal power representing the incident light intensity and the noise power. The noise power can include, for example, noise charges generated by the dark current, switching noises (e.g., read noise), device noises (e.g., shot noise), as well as errors introduced in the measurement of the signal power including, for example, the quantization errors, comparator offset, device mismatch, etc. As shown in FIG. 13, the SNR plot can be made smooth and continuous across the entire light intensity range, and at boundaries between neighboring intensity ranges. The smoothness of the SNR plot is desirable to ensure predictability in the performance of the pixel cell. In this example, the SNR plot can be made smooth due to the device noises (e.g., shot noise and dark current) mostly dominating other noises (e.g., noises generated by the measurement errors such as quantization errors, reset noise, etc.) throughout the set of incident light intensity ranges. Those noises can be reduced using the disclosed techniques, such as increasing charge-to-voltage conversion ratio for low light intensity measurement, non-uniform quantization, as well as compensation schemes for comparator offset, device mismatch, reset noises, etc.

Figure 14:
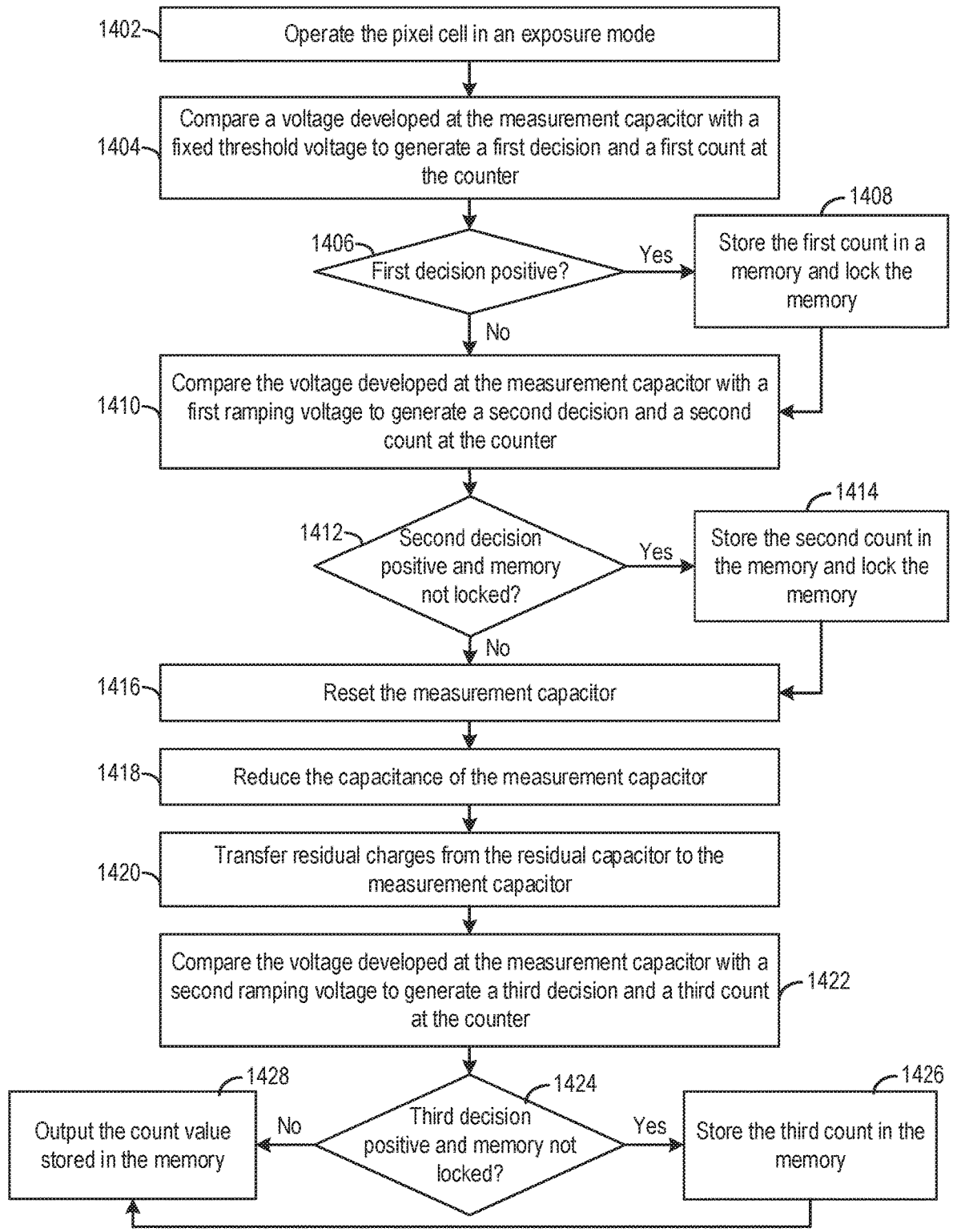
FIG. 14 illustrates an embodiment of a flowchart of a process for determining a light intensity.

FIG. 14 illustrates an embodiment of a flowchart of a process 1400 for determining incident light intensity at a pixel cell (e.g., pixel cell 600, pixel cell 1100, etc.). Process 1400 can be performed by a controller together with various components of pixel cell 600 and pixel cell 1100. Process 1400 begins in step 1402, where the pixel cell is operated in an exposure mode where the photodiode can transfer charges to the residual charge capacitor and/or the measurement capacitor. In step 1404, the pixel cell can be operated to compare a voltage developed at the measurement capacitor with a fixed threshold voltage to generate a first decision and a first count at the counter. Step 1404 can be the first measurement phase targeted for a high light intensity range, and the first count can represent a time-of-saturation measurement. If the first decision is positive (in step 1406), the pixel cell can proceed to step 1408 and store the first count in a memory and then lock the memory by asserting a first flag (e.g., FLAG_1), and then proceed to step 1410 to perform the second measurement phase. If the first decision is not positive, the pixel cell can also proceed directly to step 1410 to perform the second measurement phase.

In step 1408, the pixel cell is operated to compare the voltage developed at the measurement capacitor with a first ramping voltage to generate a second decision and a second count at the counter. Step 1408 can be the second measurement phase for a medium light intensity range. The pixel cell can then determine whether the second decision is positive, and whether the memory is not locked (e.g., based on first flag, FLAG_1 remains de-asserted), in step 1412. If the second decision is positive and the memory is not locked, the pixel cell can proceed to step 1414 and store the second count in the memory and lock the memory by asserting a second flag (e.g., FLAG_2), and then proceed to step 1416 to perform the second measurement phase. If the first decision is not positive, the pixel cell can also proceed directly to step 1416 to perform the third measurement phase.

In step 1416, as part of the third measurement phase, the pixel cell can reset the measurement capacitor to empty the stored charges. The pixel cell can also reduce the capacitance of the measurement capacitor to increase the charge-to-voltage conversion ratio, in step 1418. In step 1420, the pixel cell can transfer residual charges stored in the residual charge capacitor of the photodiode to the measurement capacitor. The pixel cell then proceeds to step 1422 to compare the voltage developed at the measurement capacitor with a second ramping voltage to generate a third decision and a third count at the counter. The pixel cell then proceeds to determine whether the third decision is positive and whether the memory is not locked (e.g., based on whether any one of first flag FLAG_1 and second flag FLAG_2 is asserted), in step 1424. If the third decision is positive and the memory is not locked, the pixel cell stores the third count in the memory in step 1426, and then proceeds to step 1428 to output the count value stored in the memory. On the other hand, if the third decision is not positive, or the memory has been locked, the pixel cell will proceed directly to step 1428 to output the count value (which can be one of the first count or the second count) stored in the memory.

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:
1. An apparatus comprising:
a photodiode configured to generate a charge in response to incident light;
a measurement capacitor to store at least a part of the charge to generate a voltage; and
an analog-to-digital converter (ADC) circuit configured to:
in a first measurement period, compare the voltage at the measurement capacitor against a static threshold voltage to generate a first output;

in a second measurement period, compare the voltage against a varying threshold voltage to generate a second output, wherein the varying threshold voltage varies with time according to a pre-determined pattern; and generate a final output representing an intensity of the incident light based on either the first output or the second output.

2. The apparatus of claim 1, wherein the ADC is configured to:

provide the first output as the final output based on determining that the voltage becomes equal to the static threshold voltage in the first measurement period; and provide the second output as the final output based on determining that the voltage becomes equal to the varying threshold voltage in the second measurement period, and based on determining that the voltage does not become equal to the static threshold voltage in the first measurement period.

3. The apparatus of claim 1, further comprising:

a transfer gate coupled between the photodiode and the measurement capacitor; and a controller configured to, in the first measurement period and in the second measurement period, bias the transfer gate with a first bias voltage to enable the photodiode to store a first quantity of the charge as residual charge, and to output a second quantity of the charge as overflow charge to the measurement capacitor when the first quantity of the charge is stored at the photodiode; and wherein the at least a part of the charge is the overflow charge.

4. The apparatus of claim 3, wherein the controller is configured to set an exposure period in which is the photodiode generates the charge based on biasing the transfer gate; and wherein the controller is configured to:
bias the transfer gate with the first bias voltage in the exposure period, and
bias the transfer gate with a second bias voltage to stop the photodiode from storing the residual charge after the exposure period ends.

5. The apparatus of claim 4, wherein:
the voltage is a first voltage;
the varying threshold voltage is a first varying threshold voltage;
the measurement capacitor is configured to store the residual charge to generate a second voltage;
the ADC is configured to, in a third measurement period, compare the second voltage against a second varying threshold voltage to generate a third output; and
the final output is generated based on either the first output, the second output, or the third output.

6. The apparatus of claim 5, wherein the ADC is configured to provide the third output as the final output based on determining that determining that the second voltage becomes equal to the second varying threshold voltage in the third measurement period, and based on determining that the first voltage does not become equal to the static threshold voltage in the first measurement period and that the first voltage does not become equal to the first varying threshold voltage in the second measurement period.

7. The apparatus of claim 5, wherein the measurement capacitor has a configurable capacitance;

wherein the controller is configured to set the measurement capacitor at a first capacitance in the first measurement period and in the second measurement period; and wherein the controller is configured to set the measurement capacitor at a second capacitance lower than the first capacitance in the third measurement period.

8. The apparatus of claim 5, wherein the first output indicates a first time when the first voltage becomes equal to the static threshold voltage within the first measurement period;

wherein the second output indicates a second time when the first voltage becomes equal to the first varying threshold voltage within the second measurement period; and wherein the third output indicates a third time when the second voltage becomes equal to the second varying threshold voltage within the third measurement period.

9. The apparatus of claim 5, further comprising:

a counter configured to output count values based on a periodic clock signal, a memory configured to store one or more count values output by the counter; and a comparator configured to:
compare the first voltage against the static threshold voltage to generate a first decision in the first measurement period;
compare the first voltage against the first varying threshold voltage to generate a second decision in the second measurement period;
compare the second voltage against the second varying threshold voltage to generate a third decision in the third measurement period; and wherein ADC is configured to store a count value representing the first output, the second output, or the third output in the memory based on the first decision, the second decision, and the third decision.

10. The apparatus of claim 9, wherein the counter is reset at a first start time of the first measurement period, at a second start time of the second measurement period, and at a third start time of the third measurement period;

the ADC is configured to:
based on the first decision indicating that the first voltage becomes equal to the static threshold voltage in the first measurement period, store a first count value from the counter corresponding to a time of the first decision in the memory as the first output;
based on the first decision indicating that the first voltage does not become equal to the static threshold voltage in the first measurement period, and the second decision indicating that the first voltage becomes equal to the first varying threshold voltage in the second measurement period, store a second count value from the counter corresponding to a time of the second decision in the memory as the second output; and
based on the first decision indicating that the first voltage does not become equal to the static threshold voltage in the first measurement period, the second decision indicating that the first voltage does not become equal to the first varying threshold voltage in the second measurement period, and the third decision indicating that the second voltage becomes equal to the second varying threshold voltage in the third measurement period, store a third count value from the counter corresponding to a time of the third decision in the memory as the third output; and wherein the stored count value is provided as the final output.

11. The apparatus of claim 9, further comprising a second capacitor coupled between the measurement capacitor and the comparator;
   wherein the controller is configured to reset both the measurement capacitor and the comparator are reset prior to the first measurement period, the second measurement period, and the third measurement period to store an error signal representing a reset noise of the measurement capacitor and an offset voltage of the comparator; and
   wherein the second capacitor is configured to:
      provide a first error-compensated version of the first voltage to the comparator to generate the first decision based on combining the first voltage with the error signal;
      provide a second error-compensated version of the second voltage to the comparator to generate the second decision based on combining the second voltage with the error signal; and
      provide a third error-compensated version of the second voltage to the comparator to generate the third decision based on combining the second voltage with the error signal.

12. The apparatus of claim 1, wherein the photodiode and the measurement capacitor are part of a pixel cell.

13. The apparatus of claim 1, wherein the varying threshold voltage comprises a voltage that increases or decreases monotonically with time based on the pre-determined pattern.

14. The apparatus of claim 13, wherein the varying threshold voltage increases or decreases by a uniform step size in each consecutive clock cycle of a periodic clock signal.

15. The apparatus of claim 13, wherein the varying threshold voltage increases or decreases by different step sizes between at least two consecutive clock cycle of a periodic clock signal.

16. A method, comprising:
   exposing a photodiode to incident light to generate a charge in response to incident light;
   storing, in a measurement capacitor, at least a part of the charge to generate a voltage;
   in a first measurement period, comparing the voltage at the measurement capacitor against a static threshold voltage to generate a first output;
   in a second measurement period, comparing the voltage against a varying threshold voltage to generate a second output, wherein the varying threshold voltage varies with time according to a pre-determined pattern; and
   generating a final output representing an intensity of the incident light based on either the first output or the second output.

17. The method of claim 16, wherein the first output is provided as the final output based on determining that the voltage becomes equal to the static threshold voltage in the first measurement period; and
   wherein the second output is provided as the final output based on determining that the voltage becomes equal to the varying threshold voltage in the second measurement period, and based on determining that the voltage does not become equal to the static threshold voltage in the first measurement period.

18. The method of claim 16, further comprising:
   in the first measurement period and in the second measurement period, enabling the photodiode to store a first quantity of the charge as residual charge, and to output a second quantity of the charge as overflow charge to the measurement capacitor when the first quantity of the charge is stored at the photodiode,
   wherein the at least a part of the charge is the overflow charge.

19. The method of claim 18,
   wherein the voltage is a first voltage;
   wherein the varying threshold voltage is a first varying threshold voltage;
   wherein the method further comprises:
      storing, at the measurement capacitor, the residual charge to generate a second voltage; and
      in a third measurement period, comparing the second voltage against a second varying threshold voltage to generate a third output; and
   wherein the final output is generated based on either the first output, the second output, or the third output.

20. The method of claim 19, wherein the third output is provided as the final output based on determining that determining that the second voltage becomes equal to the second varying threshold voltage in the third measurement period, and based on determining that the first voltage does not become equal to the static threshold voltage in the first measurement period and that the first voltage does not become equal to the first varying threshold voltage in the second measurement period.

* * * * *